United States Patent
Gao et al.

(10) Patent No.: US 12,464,530 B2
(45) Date of Patent: Nov. 4, 2025

(54) METHODS FOR COMMUNICATION, TERMINAL DEVICE, NETWORK DEVICE, AND COMPUTER READABLE MEDIA

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 361 days.

(21) Appl. No.: 17/920,609

(22) PCT Filed: Apr. 22, 2020

(86) PCT No.: PCT/CN2020/086201
§ 371 (c)(1),
(2) Date: Oct. 21, 2022

(87) PCT Pub. No.: WO2021/212381
PCT Pub. Date: Oct. 28, 2021

(65) Prior Publication Data
US 2023/0156709 A1 May 18, 2023

(51) Int. Cl.
*H04W 72/21* (2023.01)
*H04L 1/1812* (2023.01)
*H04W 72/0446* (2023.01)

(52) U.S. Cl.
CPC .......... *H04W 72/21* (2023.01); *H04L 1/1812* (2013.01); *H04W 72/0446* (2013.01)

(58) Field of Classification Search
CPC .. H04W 72/21; H04W 72/0446; H04L 1/1812
(Continued)

(56) References Cited

U.S. PATENT DOCUMENTS 10,813,119 B2 * 10/2020 Sun .................. H04L 1/1812
10,856,315 B2 * 12/2020 Yang ................ H04W 72/1268
(Continued)

FOREIGN PATENT DOCUMENTS

CN 101816145 A 8/2010
CN 103828318 A 5/2014
(Continued)

OTHER PUBLICATIONS

JP Office Action for JP Application No. 2022-564289, mailed on Oct. 10, 2023 with English Translation.
(Continued)

*Primary Examiner* — Melvin H Pollack
(74) *Attorney, Agent, or Firm* — Sughrue Mion, PLLC

(57) ABSTRACT

Embodiments of the present disclosure provide a solution for transmitting and receiving control information in a communication system. In a method for communication, a terminal device can determine that first control information is to be transmitted to a network device in a second slot after a first slot, the first control information being at least a part of previous control information transmitted in the first slot. The terminal device may determine a set of resources for second control information to be transmitted to the network device in the second slot. The terminal device may transmit, to the network device, at least one of the first control information and the second control information based on the set of resources. Embodiments of the present disclosure can improve the reliability and robustness of transmissions of control information in the communication system.

14 Claims, 15 Drawing Sheets

(58) Field of Classification Search
USPC .......................................................... 370/329
See application file for complete search history.

(56) References Cited

U.S. PATENT DOCUMENTS

| | | | |
|---|---|---|---|
| 11,265,853 B2* | 3/2022 | Kundu | H04L 5/0057 |
| 11,290,217 B2* | 3/2022 | Gao | H04L 1/08 |
| 11,363,497 B2* | 6/2022 | Jeon | H04W 28/0284 |
| 11,395,283 B2* | 7/2022 | Lin | H04W 48/16 |
| 11,646,834 B2* | 5/2023 | Wang | H04L 5/0055 |
| | | | 370/329 |
| 11,722,260 B2* | 8/2023 | Baldemair | H04W 72/23 |
| | | | 370/329 |
| 11,758,513 B2* | 9/2023 | Touboul | H04L 1/1887 |
| | | | 370/329 |
| 11,909,529 B2* | 2/2024 | Fu | H04L 1/1861 |
| 11,943,061 B2* | 3/2024 | Yin | H04W 72/21 |
| 11,974,282 B2* | 4/2024 | Nam | H04W 74/006 |
| 12,004,152 B2* | 6/2024 | Shin | H04L 1/1829 |
| 12,035,314 B2* | 7/2024 | Li | H04W 72/21 |
| 12,041,648 B2* | 7/2024 | Lee | H04L 5/1469 |
| 12,047,324 B2* | 7/2024 | Lee | H04L 1/1812 |
| 12,047,955 B2* | 7/2024 | Huang | H04L 1/1671 |
| 12,108,389 B2* | 10/2024 | Ling | H04W 72/0466 |
| 12,156,217 B2* | 11/2024 | Baldemair | H04L 1/1819 |
| 12,185,323 B2* | 12/2024 | Xu | H04L 5/0055 |
| 2014/0293942 A1 | 10/2014 | Kang et al. | |
| 2019/0082351 A1 | 3/2019 | Nammi et al. | |
| 2021/0250944 A1* | 8/2021 | Ji | H04W 72/23 |
| 2021/0336726 A1 | 10/2021 | Takeda et al. | |
| 2021/0345370 A1* | 11/2021 | Lee | H04L 1/1854 |
| 2022/0217678 A1* | 7/2022 | Yoshioka | H04W 72/02 |
| 2023/0224100 A1* | 7/2023 | Bae | H04L 1/1854 |
| | | | 370/329 |
| 2024/0178946 A1* | 5/2024 | Islam | H04L 1/1887 |
| 2024/0313907 A1* | 9/2024 | Lee | H04L 1/1671 |
| 2024/0380558 A1* | 11/2024 | Fu | H04L 1/1671 |

FOREIGN PATENT DOCUMENTS

| | | | | |
|---|---|---|---|---|
| CN | 109511169 A | | 3/2019 | |
| CN | 110557231 A | | 12/2019 | |
| CN | 111385080 A | * | 7/2020 | ........... H04B 7/0456 |
| EP | 3 599 789 A1 | | 1/2020 | |
| EP | 3748886 B1 | * | 1/2023 | ........... H04L 1/1607 |
| EP | 4117213 A1 | * | 1/2023 | ........... H04L 1/1812 |
| JP | 2023126921 A | * | 9/2023 | ........... H04L 1/0047 |
| WO | 2011/142574 A3 | | 3/2012 | |
| WO | 2020/026296 A1 | | 2/2020 | |
| WO | WO-2022214731 A1 | * | 10/2022 | ........... H04L 1/1607 |

OTHER PUBLICATIONS

Sony, L1 enhancement on UCI for URLLC, 3GPP TSG RAN WG1 #95 R1-1812743, Nov. 3, 2018.
Huawei, HISilicon, PUCCH design for LTE URLLC, 3GPP TSG RAN WG1 #92 R1-1801388, Feb. 16, 2018.
International Search Report of PCT/CN2020/086201 dated Dec. 18, 2020 [PCT/ISA/210].
Written Opinion of PCT/CN2020/086201 dated Dec. 18, 2020 [PCT/ISA/237].
Extended European Search Report issued Apr. 28, 2023 in European Application No. 20932451.6.
Vivo, "Discussion on HARQ operation for NR-U", 3GPP TSG RAN WG1 Meeting #95, R1-1812302, Nov. 12-16, 2018, Spokane, US, pp. 1-7 (7 pages total).

* cited by examiner

METHODS FOR COMMUNICATION, TERMINAL DEVICE, NETWORK DEVICE, AND COMPUTER READABLE MEDIA

CROSS REFERENCE TO RELATED APPLICATIONS

This application is a National Stage of International Application No. PCT/CN2020/086201, filed Apr. 22, 2020.

FIELD

Embodiments of the present disclosure generally relate to the field of communication, and more particularly, to a solution for transmitting and receiving control information in a communication system.

BACKGROUND

The latest developments of the Third Generation Partnership Project (3GPP) standards are referred to as Long Term Evolution (LTE) of Evolved Packet Core (EPC) network and Evolved Universal Mobile Telecommunications System (UMTS) Terrestrial Radio Access Network (E-UTRAN), also commonly termed as '4G.' In addition, the term '5G New Radio (NR)' refers to an evolving communication technology that is expected to support a variety of applications and services. The 5G NR is part of a continuous mobile broadband evolution promulgated by the 3GPP to meet new requirements associated with latency, reliability, security, scalability (for example, with Internet of Things), and other requirements. Some aspects of the 5G NR may be based on the 4G Long Term Evolution (LTE) standards.

In RAN #86, a Work Item Description (WID) on Further Enhanced Multiple Input Multiple Output (FeMIMO) was agreed. In general, MIMO includes features that facilitate utilization of a large number of antenna elements at a base station for both sub-6 GHz and over-6 GHz frequency bands. In Rel-17, channels other than physical downlink shared channel (PDSCH) can benefit from multi-transmission and reception point (TRP) transmission (as well as multi-panel reception) which also includes multi-TRP for inter-cell operations. In addition, repetitions of transmission of uplink channels (such as physical uplink control channels, PUCCHs, or physical uplink shared channels, PUSCHs) are agreed to be introduced.

SUMMARY

In general, embodiments of the present disclosure provide a solution for transmitting and receiving control information in a communication system.

In a first aspect, there is provided a method for communication. The method comprises determining, at a terminal device, that first control information is to be transmitted to a network device in a second slot after a first slot, the first control information being at least a part of previous control information transmitted in the first slot. The method also comprises determining a set of resources for second control information to be transmitted to the network device in the second slot. The method further comprises transmitting, to the network device, at least one of the first control information and the second control information based on the set of resources.

In a second aspect, there is provided a method for communication. The method comprises determining, at a network device, that first control information is to be received from a terminal device in a second slot after a first slot, the first control information being at least a part of previous control information received in the first slot. The method also comprises determining a set of resources for second control information to be received from the terminal device in the second slot. The method further comprises receiving, from the terminal device, at least one of the first control information and the second control information based on the set of resources.

In a third aspect, there is provided a terminal device. The terminal device comprises a processor and a memory storing instructions. The memory and the instructions are configured, with the processor, to cause the terminal device to perform the method according to the first aspect.

In a fourth aspect, there is provided a network device. The network device comprises a processor and a memory storing instructions. The memory and the instructions are configured, with the processor, to cause the network device to perform the method according to the second aspect.

In a fifth aspect, there is provided a computer readable medium having instructions stored thereon. The instructions, when executed on at least one processor of a device, cause the device to perform the method according to the first aspect.

In a sixth aspect, there is provided a computer readable medium having instructions stored thereon. The instructions, when executed on at least one processor of a device, cause the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
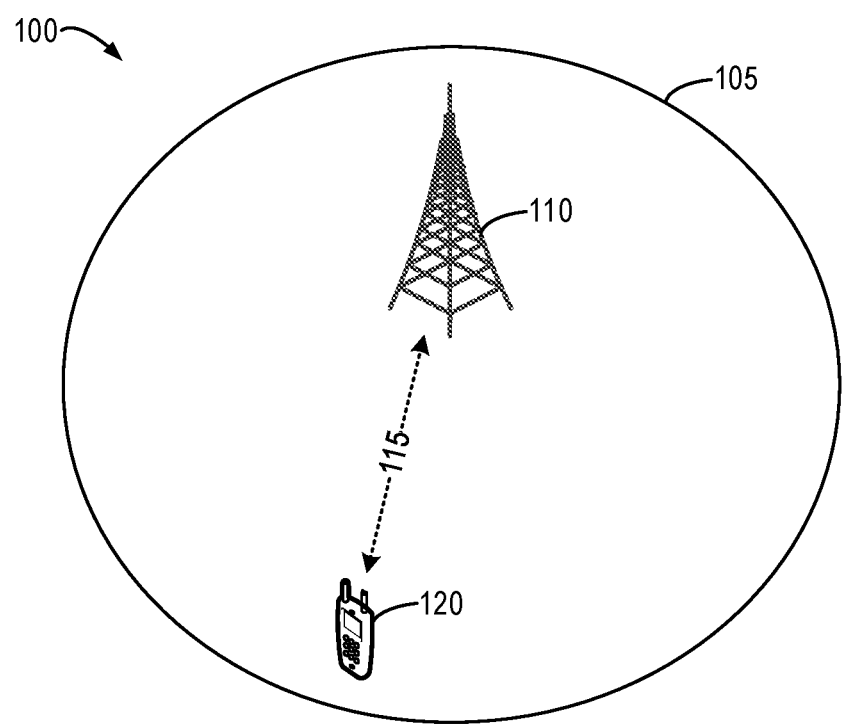
FIG. 1 is a schematic diagram of a communication environment in which some embodiments of the present disclosure can be implemented.

Principles of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), vehicle-mounted terminal devices, devices of pedestrians, roadside units, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

In some embodiments, a terminal device may be connected with a first network device and a second network device. One of the first network device and the second network device may be a master node and the other one may be a secondary node. The first network device and the second network device may use different radio access technologies (RATs).

In some embodiments, the first network device may be a first RAT device and the second network device may be a second RAT device. In some embodiments, the first RAT device is an eNB and the second RAT device is a gNB. Information related to different RATs may be transmitted to the terminal device from at least one of the first network device and the second network device. In some embodiments, first information may be transmitted to the terminal device from the first network device and second information may be transmitted to the terminal device from the second network device directly or via the first network device. In some embodiments, information related to configuration for the terminal device configured by the second network device may be transmitted from the second network device via the first network device. Information related to reconfiguration for the terminal device configured by the second network device may be transmitted to the terminal device from the second network device directly or via the first network device.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present disclosure, and may not be limited to a specific term or word. As used herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some embodiments of the present disclosure. It is noted that embodiments of the present disclosure are equally applicable to other resources in other domains.

As used herein, the singular forms "a," "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As indicated above, repetitions of transmission of uplink channels (such as PUCCHs or PUSCHs) are agreed to be introduced. Conventionally, regarding PUCCH with HARQ-ACK in one slot, Rel-15 indicates that a UE does not expect to transmit more than one PUCCH with HARQ-ACK information in a slot. In Rel-16, multi-TRP is introduced and if a UE is configured with a separate ACK/NACK feedback mode, the UE may transmit up to two PUCCHs with HARQ-ACK information in different symbols within a slot.

In recent 3GPP meeting discussions or agreements, enhancements on the support for multi-TRP deployment targeting both Frequency Range 1 (FR1) and FR2 are agreed as follows. Features may need to be identified and specified to improve reliability and robustness for channels other than PDSCH (that is, physical downlink control channel, PDCCH, PUSCH, and PUCCH) using multi-TRP and/or multi-panel, with Rel-16 reliability features as the baseline. Features may need to be identified and specified to enable inter-cell multi-TRP operations. Enhancements for simultaneous multi-TRP transmission with multi-panel reception may need to be evaluated and, if needed, be specified.

In conventional solutions, each PUCCH/PUSCH in a slot is only for feedback(s) of corresponding PDSCH occasions. However, it is not suitable for the case if PUCCH/PUSCH is repeated. For example, if PUCCH/PUSCH is repeated, how to design the feedback (such as HARQ-ACK indications, CSI reports, or the like), especially when the repeated feedback collides with scheduled feedback in one slot or overlapped in time domain, namely, having common symbol(s). One particular issue may be how to design the feedback of the repeated PUCCH/PUSCH and the original PUCCH/PUSCH in a slot. More generally, in traditional solutions, various details of some aspects related to repetitions of transmission of control information (for example, via a PUCCH or a PUSCH) have not been specified and need to be clarified.

In order to solve the above technical problems and potentially other technical problems in conventional solutions, embodiments of the present disclosure provide a solution for transmitting and receiving control information in a communication system. In some embodiments, after a terminal device transmits previous control information to a network device in a first slot, the terminal device may transmit at least one of first control information (which may be at least part of the previous control information) and second control information (which may be an initial control information) based on a set of resources determined for transmitting the second control information in a second slot after the first slot.

For example, the first control information and the second control information can be multiplexed and transmitted using the set of resources determined for transmitting the second control information. As another example, the first control information and the second control information may be transmitted using separate sets of resources in the second slot. Alternatively, the first control information and the second control information may be transmitted in different slots. In some other embodiments, one of the first control information and the second control information may be dropped if the sets of resources for transmitting them are overlapped in time domain.

With the embodiments of the present disclosure, at least one of the transmission of the first control information (which may be at least part of previous control information in a previous slot) and the transmission of the second control information (which may be an initial control information) in a current slot can be reasonably arranged to be performed, thereby improving the reliability and robustness of transmissions of control information in a communication system. Principles and implementations of the present disclosure will be described in detail below.

FIG. 1 is a schematic diagram of a communication environment 100 in which some embodiments of the present disclosure can be implemented. As shown in FIG. 1, the communication environment 100, which may also be referred to as a communication network or a communication system, includes a network device 110 serving a terminal device 120 located in a cell 105 of the network device 110. In particular, the terminal device 120 may communicate with the network device 110 via a communication channel 115. For transmissions from the network device 110 to the terminal device 120, the communication channel 115 may be referred to as a downlink channel, whereas for transmissions from the terminal device 120 to the network device 110, the communication channel 115 may alternatively be referred to as an uplink channel.

In some embodiments, the network device 110 and the terminal device 120 may communicate with each other based on time slots (or slots for short) as defined in the 3GPP specifications. For example, for subcarrier spacing configuration μ, slots are numbered $n_s^\mu \in \{0, \ldots, N_{slot}^{subframe,\mu}-1\}$ in an increasing order within a subframe and $n_{s,f}^\mu \in \{0, \ldots, N_{slot}^{frame,\mu}-1\}$ in an increasing order within a frame. There are $N_{symb}^{slot}$ consecutive Orthogonal Frequency Division Multiplexing (OFDM) symbols in a slot where $N_{symb}^{slot}$ depends on the cyclic prefix as given in related 3GPP specifications (TS 38.211), as shown in Table 1 and Table 2. The start of slot $n_s^\mu$ in a subframe is aligned in time with the start of OFDM symbol $\pi_s^\mu N_{symb}^{slot}$ in the same subframe. Other related definitions and information of slots can be found in existing or future 3GPP specifications. More generally, the term slot as used herein can refer to any existing defined unit of time or any unit of time to be defined in the future.

TABLE 1

Number of OFDM symbols per slot, slots per frame, and slots per subframe for normal cyclic prefix.

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 2

Number of OFDM symbols per slot, slots per frame, and slots per subframe for extended cyclic prefix.

| μ | $N_{symb}^{slot}$ | $N_{slot}^{frame,\mu}$ | $N_{slot}^{subframe,\mu}$ |
|---|---|---|---|
| 2 | 12 | 40 | 4 |

In order to enable or facilitate the communications between the network device 110 and the terminal device 120, the terminal device 120 may transmit control information to the network device 110 in the slots for uplink transmissions. In general, the control information may include any control information that may be transmitted to enable or facilitate various communications between the network device 110 and the terminal device 120. For example, the control information can include feedback information (such as HARQ-ACK indications) for a set of slots for downlink transmissions or a set of downlink transmissions from the network device 110 to the terminal device 120. As another example, the control information may include channel state information (CSI), such as, channel quality indications (CQI), precoding matrix indicators (PMI), rank indications (RI), and the like. As a further example, the control information can include a scheduling request (SR) for requesting the network device 110 to schedule resources for transmitting data (for example, via a PUSCH) to the network device 110. As a further example, the control information may include a Layer-1 Reference signal received power (L1-RSRP) and/or a Layer-1 Signal to Noise and Interference Ratio (L1-SINR). In other embodiments, the control information can include any suitable existing control information or control information to be defined in the future.

It is to be understood that the number of the terminal devices, the number of the network devices, the number of cells, and the number of channels as shown in FIG. 1 are only for the purpose of illustration without suggesting any limitations. The communication environment 100 may include any suitable number of terminal devices, any suitable number of network devices, any suitable number of other communication devices, any suitable number of cells, and any suitable number of channels adapted for implementing embodiments of the present disclosure.

In addition, it would be appreciated that there may be various wireless communications as well as wireline communications (if needed) among all the communication devices. Moreover, it is noted that although the network device 110 is schematically depicted as a base station and the terminal device 120 is schematically depicted as a mobile phone in FIG. 1, it is understood that these depictions are only for example without suggesting any limitation. In other embodiments, the network device 110 may be any other wireless network device, and the terminal device 120 may be any other wireless communication device.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
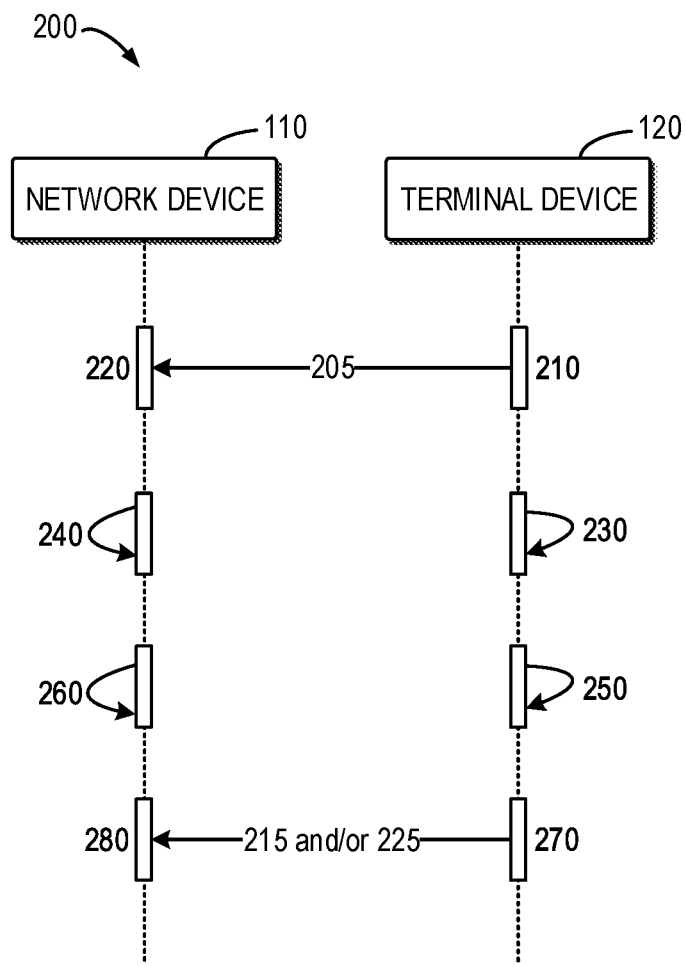
FIG. 2 illustrates an example communication process between a network device and a terminal device in accordance with some embodiments of the present disclosure.

FIG. 2 illustrates an example communication process 200 between the network device 110 and the terminal device 120 in accordance with some embodiments of the present disclosure. For the purpose of discussion, the communication process 200 will be described with reference to FIG. 1. However, it would be appreciated that the communication process 200 may be equally applicable to any other communication scenarios where two communication devices communicate with each other.

As shown in FIG. 2, the terminal device 120 may transmit 210 control information 205 to the network device 110 in a first slot. As mentioned, the control information 205 may include any control information that may be transmitted to enable or facilitate various communications between the network device 110 and the terminal device 120. For example, the control information 205 can include feedback information (such as HARQ-ACK indications), CSI (such as, CQI, PMI, RI, and the like), SR, L1-RSRP, L1-SINR and/or other potential control information. In other embodiments, the control information 205 can include any suitable existing control information or control information to be defined in the future.

In some embodiments, the control information 205 may be transmitted from the terminal device 120 to the network device 110 via a PUCCH or a PUSCH. However, in some other embodiments, the control information 205 can be transmitted via any other suitable existing communication channels or communication channels to be defined in the future from the terminal device 120 to the network device 110. As shown in FIG. 2, at the receiving side for the control information 205, the network device 110 can accordingly receive 220 the control information 205 from the terminal device 120 in the first slot, for example, via the PUCCH or the PUSCH.

As described above, in order to enhance the coverage of the control information 205 and thus improving the reliability and robustness of the transmission of the control information 205, the terminal device 120 can perform a repetition of the transmission of the control information 205, for example, in a second slot after the first slot in which the control information 205 is transmitted. For instance, in some cases, the network device 110 may previously transmit a downlink transmission (for example, a PDCCH or a PDSCH) to the terminal device 120 for several times, namely, performing repetitions of the downlink transmission in time domain. In such cases, the control information 205 which includes feedback information for such a downlink transmission may also need to be repeatedly transmitted in time domain to the network device 110.

As another example, a downlink transmission (such as an important downlink transmission or transmission for ultra-reliable low latency communication, URLLC) may include an identifier indicating that the control information 205 which includes feedback information for the downlink transmission is to be repeatedly transmitted in time domain. In some other embodiments, the terminal device 120 may be configured or preconfigured to perform a repetition of the transmission of the control information 205.

As used herein, the subsequent control information transmitted in a repetition of the transmission of the control information 205 may be referred to as first control information 215, and thus the control information 205 can be referred to as the previous control information 205. In addition, as used herein, the first control information 215 may also be referred to as repeated control information or repeated feedback information. In some embodiments, the first control information 215 may be the same as the previous control information 205. For example, as further described later with reference to FIGS. 3 and 4, the previous control information 205 and the first control information 215 can include the same set of HARQ-ACK indications.

In some other embodiments, the first control information 215 can be a portion of the previous control information 205. For example, as further described later with reference to FIGS. 5 and 6, the previous control information 205 can include a set of HARQ-ACK indications, whereas the first control information 215 can include a subset of the set of HARQ-ACK indications. Whether the first control information 215 is identical to or a part of the previous control information 205 can be configured or preconfigured, for example, by the network device 110, and thus is known to both the network device 110 and the terminal device 120.

Accordingly, in either case, the terminal device 120 may determine 230 that the first control information 215 is to be transmitted to the network device 110 in the second slot after the first slot, and that the first control information 215 can be at least a part of previous control information 205 transmitted 210 in the first slot. Since the repetition of the transmission of the previous control information 205 is configured or preconfigured, for example, by the network device 110 and is known to the network device 110, the network device 110 may also determine 240 that the first control information 215 is to be received from the terminal device 120 in the second slot after the first slot, and that the first control information 215 is at least a part of previous control information 205 received 220 in the first slot.

In addition to the first control information 215 to be transmitted in the second slot, the terminal device 120 may be scheduled or preconfigured to transmit second control information 225 in the second slot. As used herein, the second control information 225 may also be referred to as originally scheduled control information (or feedback information). In other words, the second control information 225 may not be a duplicate or a part of certain previous control information. Similar to the control information 205, the second control information 225 may also include any control information that may be transmitted to enable or facilitate various communications between the network device 110 and the terminal device 120, include HARQ-ACK indications, CSI, SR, L1-RSRP, L1-SINR and the like, or any suitable existing control information or control information to be defined in the future, or any combination thereof.

Accordingly, the terminal device 120 may determine 250 a set of resources for the second control information 225 to be transmitted to the network device 110 in the second slot. For example, the set of resources can be scheduled or preconfigured by the network device 110. In some other embodiments, the terminal device 120 can determine 250 the set of resources in any other suitable manners, for example, the terminal device 120 may select the set of resources by itself. Since the transmission of the second control information 225 is scheduled or preconfigured by the network device 110 or the set of resources selected by the terminal device 120 can be informed to the network device 110, the network device 110 may also determine 260 the set of resources for the second control information 225 to be received from the terminal device 120 in the second slot.

In other words, the terminal device 120 may determine that both the first control information 215 and the second control information 225 are to be transmitted in the same second slot, and the terminal device 120 can know the set of resources for transmitting the second control information 225. Therefore, in order to reasonably arrange the transmission of the first control information 215 and the transmission of the second control information 225, the terminal device 120 may transmit 270 at least one of the first control information 215 and the second control information 225 to the network device 110 based on the determined set of resources. In a similar manner, the network device 110 may receive 280 at least one of the first control information 215 and the second control information 225 from the terminal device 120 based on the determined set of resources. In this way, the transmission of at least partly repeated control information and the transmission of initial control information in a same slot can be properly arranged based on the determined set of resources for transmitting the initial control information, thereby improving the reliability and robustness of transmissions of control information in the communication system 100.

As an example of transmitting at least one of the first and second control information 215 and 225 based on the determined set of resources, the terminal device 120 may transmit both the first control information 215 and the second control information 225 using the determined set of resources determined for transmitting the second control information 225. In other words, the transmission of the first control information 215 and the transmission of the second control information 225 are multiplexed in the determined set of resources. Accordingly, at the receiving side, the network device 110 can receive the first control information 215 and the second control information 225 using the determined set of resources for receiving the second control information 225.

In this way, both the first control information 215 (for example, repeated feedback information) and the second control information 225 (for example, originally scheduled feedback information) can be reported from the terminal device 120 to the network device 110 without using additional separate set of transmission resources (for example, PUCCH or PUSCH resources) for transmitting the first control information 215, thereby enhancing coverage of the first control information 215 and improving the reliability and robustness of transmissions of control information in the communication system 100.

In some other embodiments, the first control information 215 and the second control information 225 can alternatively be transmitted using separate sets of resources in the second slot or can be transmitted in different slots. In some further embodiments, one of the first control information 215 and the second control information 225 can be dropped in some situations. Such various embodiments will be further described in detail later with reference to FIGS. 7-10. In the following, some embodiments will be first described with reference to FIGS. 3-6 to explain how the first control information 215 and the second control information 225 can be arranged to be transmitted using a same set of resources in the second slot.

Figure 3:
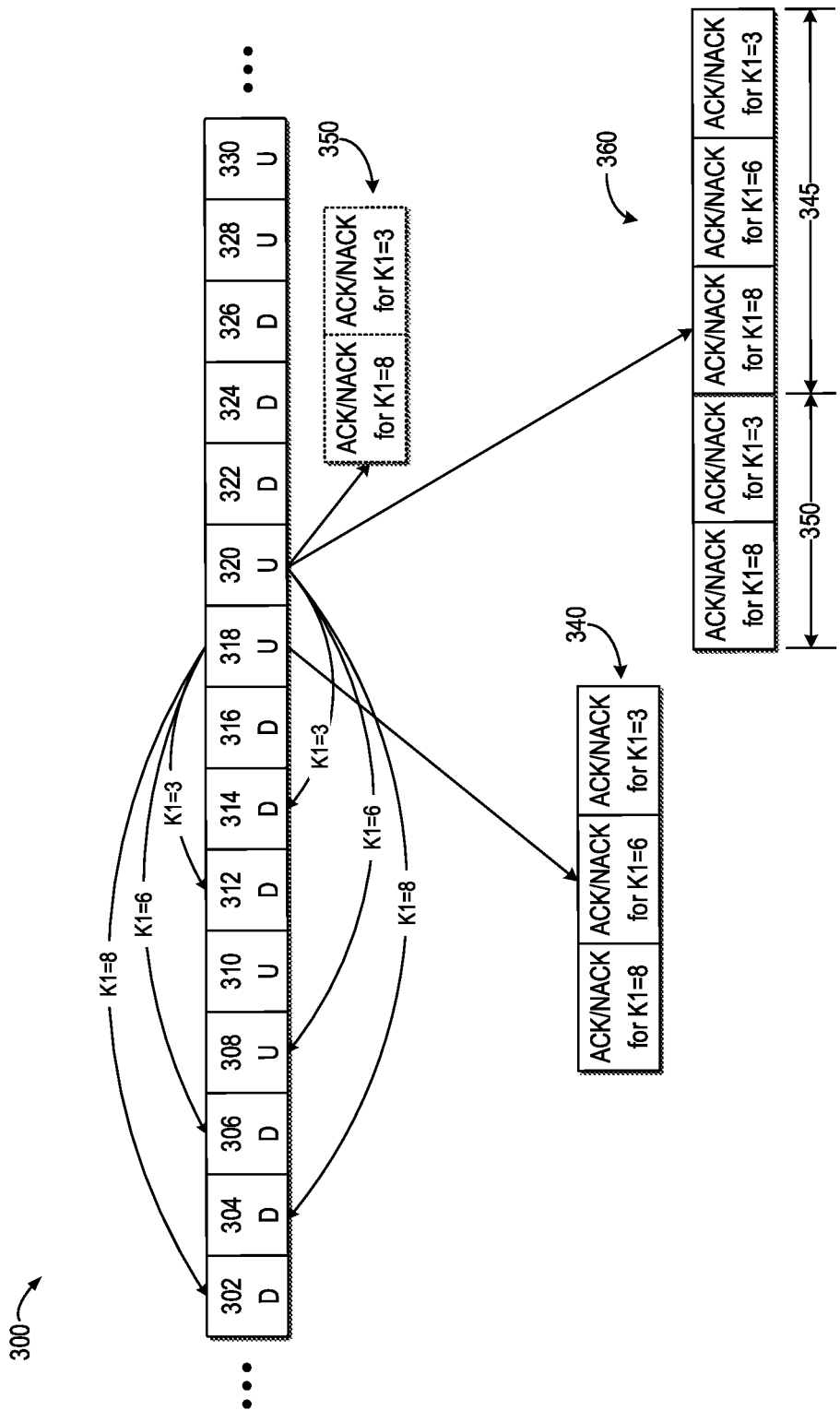
FIG. 3 illustrates an example scenario in which first control information and second control information are transmitted using a same set of resources in accordance with some embodiments of the present disclosure.

FIG. 3 illustrates an example scenario 300 in which the first control information 215 and the second control information 225 are transmitted using a same set of resources in accordance with some embodiments of the present disclosure. In FIG. 3, fifteen (15) slots 302 to 330 are shown, in which slots 302, 304, 306, 312, 314, 316, 322, 324, and 326 (denoted as "D") are slots for downlink transmissions from the network device 110 to the terminal device 120, whereas slots 308, 310, 318, 320, 328, and 330 (denoted as "U") are slots for uplink transmissions from the terminal device 120 to the network device 110. It is to be understood that the number of the slots, the purposes of the slots, and the arrangement of the slots as shown in FIG. 3 are only for example without suggesting any limitations. Embodiments of the present disclosure are equally applicable to any suitable number of the slots, any suitable purposes of the slots, and any suitable arrangement of the slots.

With reference to both FIGS. 2 and 3, the slot 318 may be taken as an example of the first slot as discussed above, and the slot 320 may be taken as an example of the second slot as discussed above, without loss of generality. Although FIG. 3 shows that the second slot 320 is immediately after the first slot 318, it is only for example without suggesting any limitations. In other embodiments, there may be a number of slots between the first slot and the second slot.

In the following, some embodiments are described in which HARQ-ACK indications (also referred to as ACK/NACK indications) are included in the previous control information 205, the first control information 215, or the second control information 225. However, it is to be appreciated that the HARQ-ACK indications as shown in FIG. 3 are only an example of the content of the previous control information 205, the first control information 215, or the second control information 225 without suggesting any limitations. Embodiments of the present disclosure are equally applicable to any other content (for example, CSI, SR, L1-RSRP, L1-SINR or the like) of the previous control information 205, the first control information 215, or the second control information 225. Further, it is noted that the examples of the content of the previous control information 205, the first control information 215, or the second control information 225 as shown in FIG. 3 are equally applicable to other embodiments of the present disclosure including those as shown in FIGS. 7-12.

In some embodiments, the terminal device 120 can employ a semi-static HARQ-ACK codebook to generate HARQ-ACK indications to be included in the previous control information 205, the first control information 215, or the second control information 225 for transmitting to the network device 110. The semi-static HARQ-ACK codebook design is specified in 3GPP TS 38.213, section 9.1.2, Type-1 HARQ-ACK codebook determination.

As described in FIG. 2, the terminal device 120 can transmit 210 the previous control information 205 (for example, via a PUCCH or a PUSCH) to the network device 110 in the first slot 318. As shown in FIG. 3, with a semi-static HARQ-ACK codebook, the terminal device 120 may be configured with a set of K1 values {3, 6, 8} for transmitting HARQ-ACK indications to the network device 110 in the first slot 318. Each K1 value may indicate an offset between a slot in which a downlink transmission (for example, a PDCCH or a PDSCH) is transmitted and a slot in which a HARQ-ACK indication for the downlink transmission is transmitted.

For example, the set of K1 values may be configured by the network device 110 via a radio resource control (RRC) message, and the network device 110 can use scheduling signaling (for example, a PDCCH) for a downlink transmission (for example, a PDSCH) to indicate a value from the set of K1 values. Based on the value indicated in the scheduling signaling, the terminal device 120 can determine the slot in which the HARQ-ACK indication for this downlink transmission is to be transmitted. It is to be understood that the specific number of the K1 values in the set of K1 values and the specific values of the K1 values are only for example without suggesting any limitations. Embodiments of the present disclosure are equally applicable to any set of K1 values, in which there is any number of K1 values and the K1 values can have any specific values.

With a semi-static HARQ-ACK codebook and the K1 values {3, 6, 8}, for the first slot 318, the terminal device 120 can generate a HARQ-ACK codebook including a HARQ-ACK indication for the downlink transmission in the slot 312 which has an offset of three (3) slots from the slot 318, a HARQ-ACK indication for the downlink transmission in the slot 306 which has an offset of six (6) slots from the slot 318, and a HARQ-ACK indication for the downlink transmission in the slot 302 which has an offset of eight (8) slots from the slot 318.

Accordingly, the previous control information 205 transmitted by the terminal device 120 in the first slot 318 may include a previous set of ACK/NACK indications 340 for a previous set of slots (for example, slots 302, 306, and 312) for downlink transmissions.

With reference to both FIGS. 2 and 3, the first control information 215 and the second control information 225 can be transmitted 270 in the second slot 320 using the same set of resources. In the example of FIG. 3, the first control information 215 is the same as the previous control information 205. Accordingly, the terminal device 120 may generate the first control information 215 to include a first set of ACK/NACK indications 345 for a first set of slots 302, 306 and 314 for downlink transmissions, which is identical to the previous set of ACK/NACK indications 340. For example, the first control information 215 may be encoded before or after the second control information 225 in the same set of resources. In this way, the first control information 215 can be generated based on a semi-static HARQ-ACK codebook, and thus the size of the HARQ-ACK codebook can be fixed and the ambiguity of HARQ-ACK indications between the network device 110 and the terminal device 120 can be eliminated. In addition, since the counter downlink assignment indicator, DAI, and total DAI for a dynamic HARQ-ACK codebook do not need to be indicated to the terminal device 120, the complexity of the scheduling signaling for downlink transmissions can be reduced.

As further shown in FIG. 3, with a semi-static HARQ-ACK codebook, the terminal device 120 may be also configured with a set of K1 values {3, 6, 8} for transmitting HARQ-ACK indications to the network device 110 in the second slot 320. That is, for the second slot 320, the terminal device 120 can generate a HARQ-ACK codebook including a HARQ-ACK indication for the downlink transmission in the slot 314 which has an offset of three (3) slots from the second slot 320, a HARQ-ACK indication for the downlink transmission in the slot 308 which has an offset of six (6) slots from the second slot 320, and a HARQ-ACK indication for the downlink transmission in the slot 304 which has an offset of eight (8) slots from the second slot 320.

In the example of FIG. 3, the slot 308 is used for uplink transmissions rather than downlink transmissions and thus there are no downlink transmissions in the slot 308. Accordingly, the terminal device 120 may generate the second control information 225 to include a second set of ACK/NACK indications 350 for a second set of slots 304 and 314 for downlink transmissions. In this way, the second control information 225 can be generated based on a semi-static HARQ-ACK codebook, and thus the size of the HARQ-ACK codebook can be fixed and the ambiguity of HARQ-ACK indications between the network device 110 and the terminal device 120 can be eliminated. In addition, since the counter DAI and total DAI do not need to be indicated to the terminal device 120, the complexity of the scheduling signaling for downlink transmissions can be reduced.

Then, the terminal device 120 may transmit the first control information 215 and the second control information 225 using the same set of resources in the second slot 320, for example, the same set of resources for a PUCCH or a PUSCH in the second slot 320. In some embodiments, in order to transmit the first control information 215 and the second control information 225 using the same set of resources, the terminal device 120 can generate a combined HARQ-ACK codebook 360, which may include the first set of ACK/NACK indications 345 and the second set of ACK/NACK indications 350. For example, the first set of ACK/NACK indications 345 may be before or after the second set of ACK/NACK indications 350 in the combined HARQ-ACK codebook. In the example of FIG. 3, the first set of ACK/NACK indications 345 may also be referred to as a repeated part of the combined HARQ-ACK codebook 360, and the second set of ACK/NACK indications 350 may also be referred to as a scheduled part of the combined HARQ-ACK codebook 360.

Although FIG. 3 shows that the second set of ACK/NACK indications 350 is immediately before the first set of ACK/NACK indications 345 in one combined HARQ-ACK codebook 360, this is only for example without suggesting any limitation. In other embodiments, the first set of ACK/NACK indications 345 may be before the second set of ACK/NACK indications 350, the first set of ACK/NACK indications 345 and the second set of ACK/NACK indications 350 can be separated by other information and may be included in separated HARQ-ACK codebooks.

In the example of FIG. 3, at the receiving side, since the content of the first control information 215 and the second control information 225 is configured or preconfigured by the network device 110, the network device 110 may determine that the first control information 215 includes the first set of ACK/NACK indications 345 for the first set of slots 302, 306 and 314 for downlink transmissions. Also, the network device 110 may determine that the second control information 225 includes the second set of ACK/NACK indications 350 for the second set of slots 304 and 314 for downlink transmissions.

Figure 4:
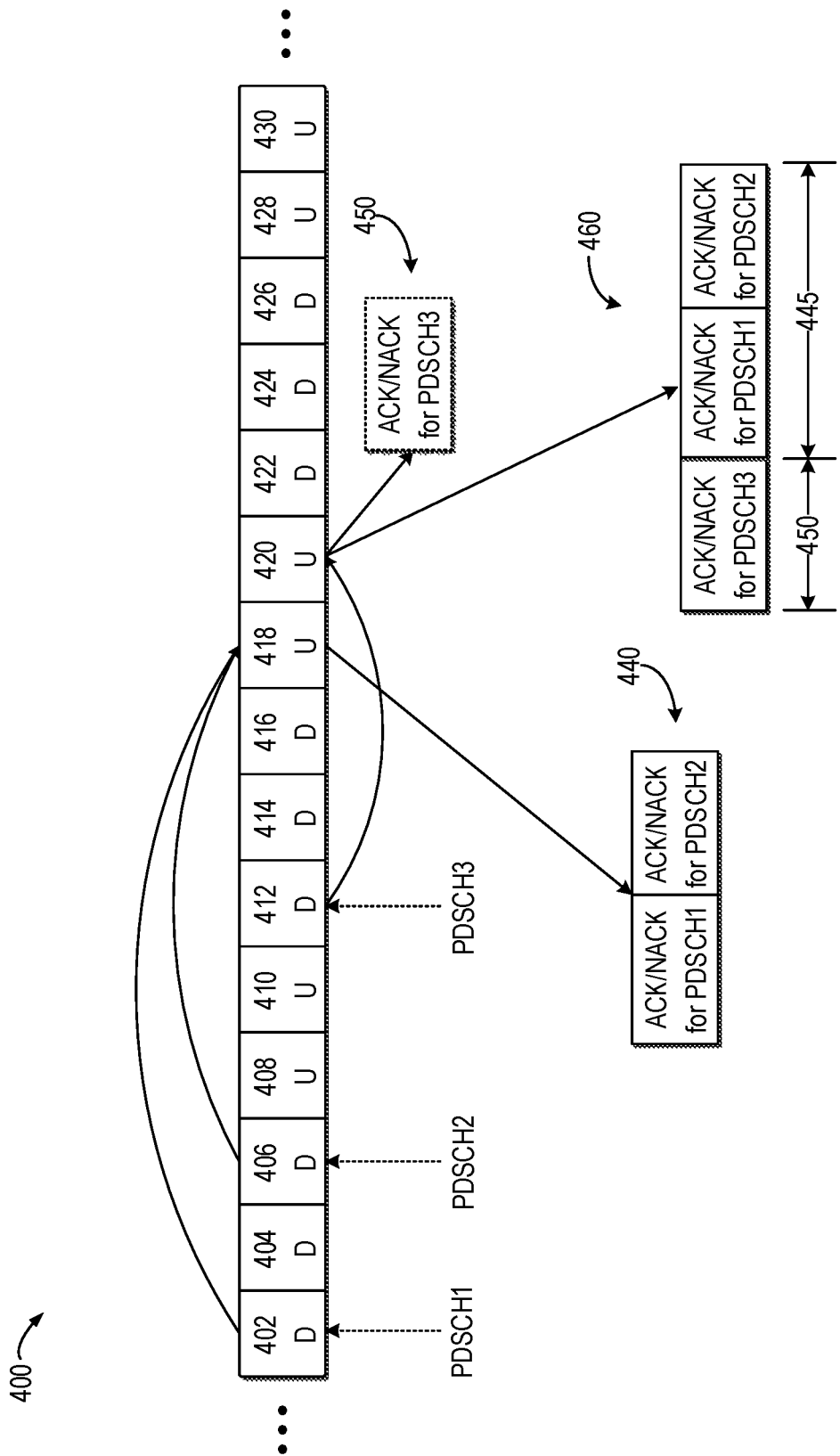
FIG. 4 illustrates another example scenario in which first control information and second control information are transmitted using a same set of resources in accordance with some embodiments of the present disclosure.

FIG. 4 illustrates another example scenario 400 in which the first control information 215 and the second control information 225 are transmitted using a same set of resources in accordance with some embodiments of the present disclosure. For example, the first control information 215 may be encoded before or after the second control information 225 in the same set of resources. In FIG. 4, fifteen (15) slots 402 to 430 are shown, in which slots 402, 404, 406, 412, 414, 416, 422, 424, and 426 (denoted as "D") are slots for downlink transmissions from the network device 110 to the terminal device 120, whereas slots 408, 410, 418, 420, 428, and 430 (denoted as "U") are slots for uplink transmissions from the terminal device 120 to the network device 110. It is to be understood that the number of the slots, the purposes of the slots, and the arrangement of the slots as shown in FIG. 4 are only for example without suggesting any limitations. Embodiments of the present disclosure are equally applicable to any suitable number of the slots, any suitable purposes of the slots, and any suitable arrangement of the slots.

With reference to both FIGS. 2 and 4, the slot 418 may be taken as an example of the first slot as discussed above, and the slot 420 may be taken as an example of the second slot as discussed above, without loss of generality. Although FIG. 4 shows that the second slot 420 is immediately after the first slot 418, it is only for example without suggesting any limitations. In other embodiments, there may be a number of slots between the first slot and the second slot.

In the following, some embodiments are described in which HARQ-ACK indications (also referred to as ACK/NACK indications) are included in the previous control information 205, the first control information 215, or the second control information 225. However, it is to be appreciated that the HARQ-ACK indications as shown in FIG. 4 are only an example of the content of the previous control information 205, the first control information 215, or the second control information 225 without suggesting any limitations. Embodiments of the present disclosure are equally applicable to any other content (for example, CSI, SR, L1-RSRP, L1-SINR or the like) of the previous control information 205, the first control information 215, or the second control information 225. Further, it is noted that the examples of the content of the previous control information 205, the first control information 215, or the second control information 225 as shown in FIG. 4 are equally applicable to other embodiments of the present disclosure including those as shown in FIGS. 7-12.

In some embodiments, the terminal device 120 can employ a dynamic HARQ-ACK codebook to generate HARQ-ACK indications to be included in the previous control information 205, the first control information 215, or the second control information 225 for transmitting to the network device 110. The dynamic HARQ-ACK codebook design is specified in 3GPP TS 38.213, section 9.1.3.1, Type-2 HARQ-ACK codebook in physical uplink control channel. With a dynamic HARQ-ACK codebook, if one PDCCH is missed or unsuccessfully decoded, a UE can know the missed detection (based on a counter DAI and a total DAI), and the ACK/NACK bit(s) field for this PDCCH scheduling can be reserved, and a NACK may be reported.

As described in FIG. 2, the terminal device 120 can transmit 210 the previous control information 205 (for example, via a PUCCH or a PUSCH) to the network device 110 in the first slot 418. As shown in FIG. 4, it is assumed that the network device 110 performs downlink transmissions (for example, PDSCH1, PDSCH2, and PDSCH3) to the terminal device 120 in the slots 402, 406, and 412, respectively. With a dynamic HARQ-ACK codebook, the terminal device 120 may be configured by the network device 110 (for example, via scheduling information for the downlink transmission) to transmit in the first slot 418 the HARQ-ACK indications for the PDSCH1 and the PDSCH2.

That is, for the first slot 418, the terminal device 120 can generate a HARQ-ACK codebook including a HARQ-ACK indication for the downlink transmission (for example, the PDSCH1) in the slot 402 and a HARQ-ACK indication for the downlink transmission (for example, the PDSCH2) in the slot 406. Accordingly, the previous control information 205 transmitted by the terminal device 120 in the first slot 418 may include a previous set of ACK/NACK indications 440 for a previous set of downlink transmissions (for example, the PDSCH1 and the PDSCH2) transmitted by the network device 110.

With reference to both FIGS. 2 and 4, the first control information 215 and the second control information 225 can be transmitted in the second slot 420 using the same set of resources. For example, the first control information 215 may be encoded before or after the second control information 225 in the same set of resources. In the example of FIG. 4, the first control information 215 is the same as the previous control information 205. Accordingly, the terminal device 120 may generate the first control information 215 to include a first set of ACK/NACK indications 445 for a first set of downlink transmissions (for example, the PDSCH1 and the PDSCH2) transmitted by the network device 110, which is identical to the previous set of ACK/NACK indications 440. In this way, the first control information 215 can be generated based on a dynamic HARQ-ACK codebook, thereby reducing the signaling overhead of the HARQ-ACK codebook.

As further shown in FIG. 4, with a dynamic HARQ-ACK codebook, the terminal device 120 may be configured by the network device 110 (for example, via scheduling information for the downlink transmission) to transmit in the second slot 420 the HARQ-ACK indication for the PDSCH3. That is, for the second slot 420, the terminal device 120 can generate a HARQ-ACK codebook including a HARQ-ACK indication for the downlink transmission in the slot 412. Accordingly, the terminal device 120 may generate the second control information 225 to include a second set of ACK/NACK indications 450 for a second set of downlink transmissions (for example, the PDSCH3) transmitted by the network device 110. In this way, the second control information 225 can be generated based on a dynamic HARQ-ACK codebook, thereby reducing the signaling overhead of the HARQ-ACK codebook.

Then, the terminal device 120 may transmit the first control information 215 and the second control information 225 using the same set of resources in the second slot 420, for example, the same set of resources for a PUCCH or a PUSCH in the second slot 420. In some embodiments, in order to transmit the first control information 215 and the second control information 225 using the same set of resources, the terminal device 120 can generate a combined HARQ-ACK codebook 460, which may include the first set of ACK/NACK indications 445 and the second set of ACK/NACK indications 450. In the example of FIG. 4, the first set of ACK/NACK indications 445 may also be referred to as a repeated part of the combined HARQ-ACK codebook 460, and the second set of ACK/NACK indications 450 may also be referred to as a scheduled part of the combined HARQ-ACK codebook 460.

Although FIG. 4 shows that the second set of ACK/NACK indications 450 is immediately before the first set of ACK/NACK indications 445 in one combined HARQ-ACK codebook 460, this is only for example without suggesting any limitation. In other embodiments, the first set of ACK/NACK indications 445 may be before the second set of ACK/NACK indications 450, the first set of ACK/NACK indications 445 and the second set of ACK/NACK indications 450 can be separated by other information and may be included in separated HARQ-ACK codebooks.

In the example of FIG. 4, at the receiving side, since the content of the first control information 215 and the second control information 225 is configured or preconfigured by the network device 110, the network device 110 may determine that the first control information 215 includes the first set of ACK/NACK indications 445 for the first set of downlink transmissions (for example, the PDSCH1 and the PDSCH2) transmitted by the network device 110. Also, the network device 110 may determine that the second control information 225 includes the second set of ACK/NACK indications 450 for the second set of downlink transmissions (for example, the PDSCH3) transmitted by the network device 110.

Figure 5:
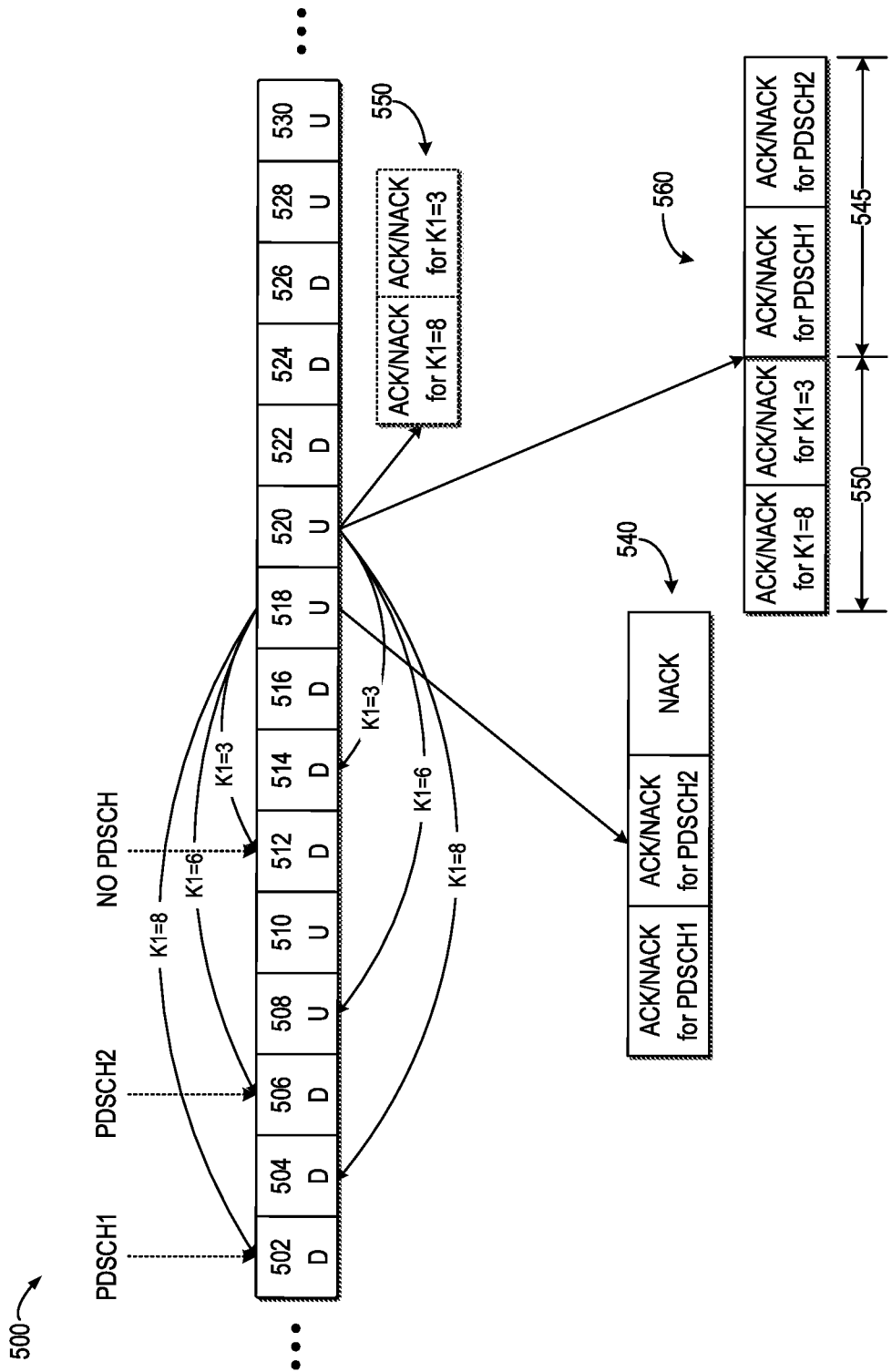
FIG. 5 illustrates a further example scenario in which first control information and second control information are transmitted using a same set of resources in accordance with some embodiments of the present disclosure.

FIG. 5 illustrates a further example scenario 500 in which the first control information 215 and the second control information 225 are transmitted using a same set of resources in accordance with some embodiments of the present disclosure. In FIG. 5, fifteen (15) slots 502 to 530 are shown, in which slots 502, 504, 506, 512, 514, 516, 522, 524, and 526 (denoted as "D") are slots for downlink transmissions from the network device 110 to the terminal device 120, whereas slots 508, 510, 518, 520, 528, and 530 (denoted as "U") are slots for uplink transmissions from the terminal device 120 to the network device 110. It is to be understood that the number of the slots, the purposes of the slots, and the arrangement of the slots as shown in FIG. 5 are only for example without suggesting any limitations. Embodiments of the present disclosure are equally applicable to any suitable number of the slots, any suitable purposes of the slots, and any suitable arrangement of the slots.

With reference to both FIGS. 2 and 5, the slot 518 may be taken as an example of the first slot as discussed above, and the slot 520 may be taken as an example of the second slot as discussed above, without loss of generality. Although FIG. 5 shows that the second slot 520 is immediately after the first slot 518, it is only for example without suggesting any limitations. In other embodiments, there may be a number of slots between the first slot and the second slot.

In the following, some embodiments are described in which HARQ-ACK indications (also referred to as ACK/NACK indications) are included in the previous control information 205, the first control information 215, or the second control information 225. However, it is to be appreciated that the HARQ-ACK indications as shown in FIG. 5 are only an example of the content of the previous control information 205, the first control information 215, or the second control information 225 without suggesting any limitations. Embodiments of the present disclosure are equally applicable to any other content (for example, CSI, SR, L1-RSRP, L1-SINR or the like) of the previous control information 205, the first control information 215, or the second control information 225. Further, it is noted that the examples of the content of the previous control information 205, the first control information 215, or the second control information 225 as shown in FIG. 5 are equally applicable to other embodiments of the present disclosure including those as shown in FIGS. 7-12.

In some embodiments, the terminal device 120 can employ a semi-static HARQ-ACK codebook to generate HARQ-ACK indications to be included in the previous control information 205, the first control information 215, or the second control information 225 for transmitting to the network device 110. As described in FIG. 2, the terminal device 120 may transmit 210 the previous control information 205 (for example, via a PUCCH or a PUSCH) to the network device 110 in the first slot 518. As shown in FIG. 5, with a semi-static HARQ-ACK codebook, the terminal device 120 may be configured with a set of K1 values {3, 6, 8} for transmitting HARQ-ACK indications to the network device 110 in the first slot 518.

With a semi-static HARQ-ACK codebook and the K1 values {3, 6, 8}, for the first slot 518, the terminal device 120 can generate a HARQ-ACK codebook including a HARQ-ACK indication for the downlink transmission in the slot 512 which has an offset of three (3) slots from the slot 518, a HARQ-ACK indication for the downlink transmission in the slot 506 which has an offset of six (6) slots from the slot 518, and a HARQ-ACK indication for the downlink transmission in the slot 502 which has an offset of eight (8) slots from the slot 518. Accordingly, the previous control information 205 transmitted by the terminal device 120 in the first slot 518 may include a previous set of ACK/NACK indications 540 for a previous set of slots (for example, slots 502, 506, and 512) for downlink transmissions.

In the example of FIG. 5, the network device 110 performs a downlink transmission (for example, PDSCH1) to the terminal device 120 in the slot 502, performs a downlink transmission (for example, PDSCH2) to the terminal device 120 in the slot 506, but does not perform a downlink transmission (denoted as no PDSCH) to the terminal device 120 in the slot 512. With a semi-static HARQ-ACK codebook, the terminal device 120 may normally generate ACK/NACK indications for the slots 502 and 506 according to whether the downlink transmissions (for example, the PDSCH1 and the PDSCH2) are successfully received, and may also generate a NACK indication for the slot 512 in which no downlink transmission is received by the terminal device 120, which ACK/NACK indications are shown in the previous set of ACK/NACK indications 540. As used herein, the NACK indication for the slot 512 without associated downlink transmission (for example, a PDSCH) scheduling may also be referred to as a reserved ACK/NACK field.

With reference to both FIGS. 2 and 5, the first control information 215 and the second control information 225 can be transmitted in the second slot 520 using the same set of resources. In the example of FIG. 5, the first control information 215 is a part of the previous control information 205. In particular, the first control information 215 may not include the NACK indication for the slot 512 in which no downlink transmission is received by the terminal device 120. Accordingly, the terminal device 120 may generate the first control information 215 to include a first set of ACK/NACK indications 545 for a first set of downlink transmissions (for example, the PDSCH1 and the PDSCH2) received by the terminal device 120, which is different from the previous set of ACK/NACK indications 540. That is, the first control information 215 does not include HARQ-ACK feedback bit(s) for non-scheduled occasion(s). In this way, since the reserved ACK/NACK field is excluded from the first control information 215, the signaling overhead for the first control information 215 can be reduced.

As further shown in FIG. 5, with a semi-static HARQ-ACK codebook, the terminal device 120 may be also configured with a set of K1 values {3, 6, 8} for transmitting HARQ-ACK indications to the network device 110 in the second slot 520. That is, for the second slot 520, the terminal device 120 can generate a HARQ-ACK codebook including a HARQ-ACK indication for the downlink transmission in the slot 514 which has an offset of three (3) slots from the second slot 520, a HARQ-ACK indication for the downlink transmission in the slot 508 which has an offset of six (6) slots from the second slot 520, and a HARQ-ACK indication for the downlink transmission in the slot 504 which has an offset of eight (8) slots from the second slot 520.

In the example of FIG. 5, the slot 508 is used for uplink transmissions rather than downlink transmissions and thus there are no downlink transmissions in the slot 508. Accordingly, the terminal device 120 may generate the second control information 225 to include a second set of ACK/NACK indications 550 for a second set of slots 504 and 514 for downlink transmissions. In this way, the second control information 225 can be generated based on a semi-static HARQ-ACK codebook, and thus the size of the HARQ-ACK codebook can be fixed and the ambiguity of HARQ-ACK indications between the network device 110 and the terminal device 120 can be eliminated. In addition, since the counter DAI and total DAI do not need to be indicated to the terminal device 120, the complexity of the scheduling signaling for downlink transmissions can be reduced.

Then, the terminal device 120 may transmit the first control information 215 and the second control information 225 using the same set of resources in the second slot 520, for example, the same set of resources for a PUCCH or a PUSCH in the second slot 520. In some embodiments, in order to transmit the first control information 215 and the second control information 225 using the same set of resources, the terminal device 120 can generate a combined HARQ-ACK codebook 560, which may include the first set of ACK/NACK indications 545 and the second set of ACK/NACK indications 550. In the example of FIG. 5, the first set of ACK/NACK indications 545 may also be referred to as a compressed repeated part of the combined HARQ-ACK codebook 560, and the second set of ACK/NACK indications 550 may also be referred to as a scheduled part of the combined HARQ-ACK codebook 560.

Although FIG. 5 shows that the second set of ACK/NACK indications 550 is immediately before the first set of ACK/NACK indications 545 in one HARQ-ACK codebook, this is only for example without suggesting any limitation. In other embodiments, the first set of ACK/NACK indications 545 may be before the second set of ACK/NACK indications 550, the first set of ACK/NACK indications 545 and the second set of ACK/NACK indications 550 can be separated by other information and may be included in separated HARQ-ACK codebooks.

In the example of FIG. 5, at the receiving side, since the content of the first control information 215 and the second control information 225 is configured or preconfigured by the network device 110, the network device 110 may determine that the first control information 215 includes the first set of ACK/NACK indications 545 for the first set of downlink transmissions (for example, the PDSCH1 and the PDSCH2) received by the terminal device 120. Also, the network device 110 may determine that the second control information 225 includes the second set of ACK/NACK indications 550 for the second set of slots 504 and 514 for downlink transmissions.

Figure 6:
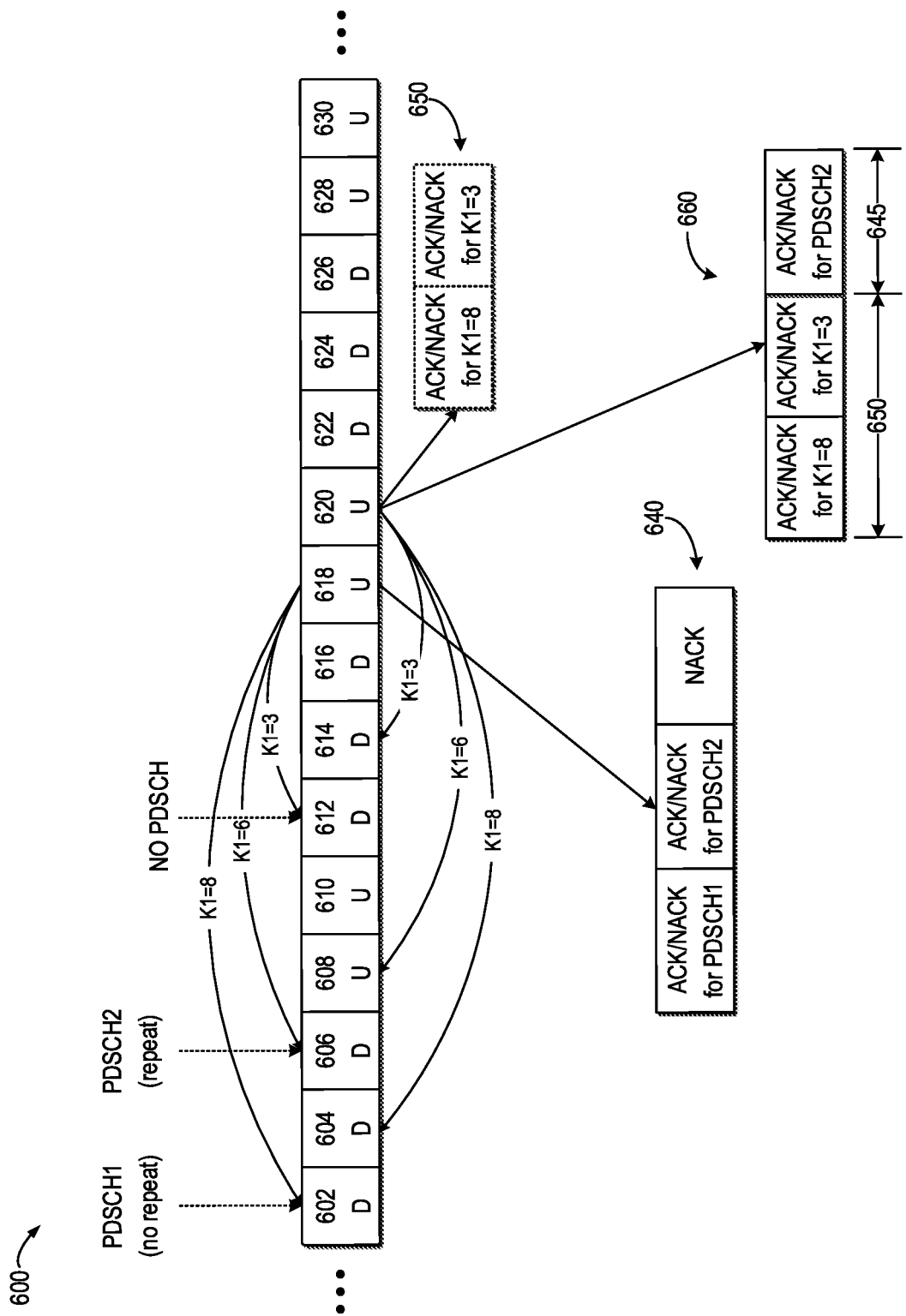
FIG. 6 illustrates a still further example scenario in which first control information and second control information are transmitted using a same set of resources in accordance with some embodiments of the present disclosure.

FIG. 6 illustrates a still further example scenario 600 in which the first control information 215 and the second control information 225 are transmitted using a same set of resources in accordance with some embodiments of the present disclosure. In FIG. 6, fifteen (15) slots 602 to 630 are shown, in which slots 602, 604, 606, 612, 614, 616, 622, 624, and 626 (denoted as "D") are slots for downlink transmissions from the network device 110 to the terminal device 120, whereas slots 608, 610, 618, 620, 628, and 630 (denoted as "U") are slots for uplink transmissions from the terminal device 120 to the network device 110. It is to be understood that the number of the slots, the purposes of the slots, and the arrangement of the slots as shown in FIG. 6 are only for example without suggesting any limitations. Embodiments of the present disclosure are equally applicable to any suitable number of the slots, any suitable purposes of the slots, and any suitable arrangement of the slots.

With reference to both FIGS. 2 and 6, the slot 618 may be taken as an example of the first slot as discussed above, and the slot 620 may be taken as an example of the second slot as discussed above, without loss of generality. Although FIG. 6 shows that the second slot 620 is immediately after the first slot 618, it is only for example without suggesting any limitations. In other embodiments, there may be a number of slots between the first slot and the second slot.

In the following, some embodiments are described in which HARQ-ACK indications (also referred to as ACK/NACK indications) are included in the previous control information 205, the first control information 215, or the second control information 225. However, it is to be appreciated that the HARQ-ACK indications as shown in FIG. 6 are only an example of the content of the previous control information 205, the first control information 215, or the second control information 225 without suggesting any limitations. Embodiments of the present disclosure are equally applicable to any other content (for example, CSI, SR, L1-RSRP, L1-SINR or the like) of the previous control information 205, the first control information 215, or the second control information 225. Further, it is noted that the examples of the content of the previous control information 205, the first control information 215, or the second control information 225 as shown in FIG. 6 are equally applicable to other embodiments of the present disclosure including those as shown in FIGS. 7-12.

In some embodiments, the terminal device 120 can employ a semi-static HARQ-ACK codebook to generate HARQ-ACK indications to be included in the previous control information 205, the first control information 215, or the second control information 225 for transmitting to the network device 110. Although the terminal device 120 uses a semi-static HARQ-ACK codebook in the example of FIG. 6, it should be noted that embodiments of the present disclosure associated with FIG. 6 are equally applicable to a scenario in which the terminal device 120 employs a dynamic HARQ-ACK codebook to generate HARQ-ACK indications to be included in the previous control information 205, the first control information 215, or the second control information 225 for transmitting to the network device 110.

As described in FIG. 2, the terminal device 120 may transmit 210 the previous control information 205 (for example, via a PUCCH or a PUSCH) to the network device 110 in the first slot 618. As shown in FIG. 6, with a semi-static HARQ-ACK codebook, the terminal device 120 may be configured with a set of K1 values {3, 6, 8} for transmitting HARQ-ACK indications to the network device 110 in the first slot 618. With a semi-static HARQ-ACK codebook and the K1 values {3, 6, 8}, for the first slot 618, the terminal device 120 can generate a HARQ-ACK codebook including a HARQ-ACK indication for the downlink transmission in the slot 612 which has an offset of three (3) slots from the slot 618, a HARQ-ACK indication for the downlink transmission in the slot 606 which has an offset of six (6) slots from the slot 618, and a HARQ-ACK indication for the downlink transmission in the slot 602 which has an offset of eight (8) slots from the slot 618.

Accordingly, the previous control information 205 transmitted by the terminal device 120 in the first slot 618 may include a previous set of ACK/NACK indications 640 for a previous set of slots (for example, slots 602, 606, and 612) for downlink transmissions. Alternatively, if a dynamic HARQ-ACK codebook is employed to generate the previous set of ACK/NACK indications, the terminal device 120 may generate the previous control information 205 to include the previous set of ACK/NACK indications for downlink transmissions transmitted by the network device 110.

In the example of FIG. 6, the network device 110 performs a downlink transmission (for example, PDSCH1) to the terminal device 120 in the slot 602, performs a downlink transmission (for example, PDSCH2) to the terminal device 120 in the slot 606, but does not perform a downlink transmission (denoted as no PDSCH) to the terminal device 120 in the slot 612. With a semi-static HARQ-ACK codebook, the terminal device 120 may normally generate ACK/NACK indications for the slots 602 and 606 according to whether the downlink transmissions (for example, the PDSCH1 and the PDSCH2) are successfully received, and may also generate a NACK indication for the slot 612 in which no downlink transmission is received by the terminal device 120, which ACK/NACK indications are shown in the previous set of ACK/NACK indications 640. As used herein, the NACK indication for the slot 612 without associated downlink transmission (for example, a PDSCH) scheduling may also be referred to as a reserved ACK/NACK field.

In addition, the downlink transmission (for example, the PDSCH1, which may be associated with an Enhanced Mobile Broadband, EMBB, service) in the slot 602 is configured or preconfigured as no repetition of the transmission of the related ACK/NACK indication is needed (denoted as no repeat), whereas the downlink transmission (for example, the PDSCH2, which may be associated with a ultra-reliable low latency communication, URLLC, service) in the slot 606 is configured or preconfigured as one or more repetitions of the transmission of the related ACK/NACK indication are needed (denoted as repeat).

For example, for a PDSCH and/or a PDCCH which is configured or preconfigured to be repeatedly transmitted from the network device 110 to the terminal device 120, the associated ACK/NACK field may also need to be repeatedly transmitted from the terminal device 120 to the network device 110. In contrast, for other PDSCHs and/or PDCCHs which are not configured or preconfigured to be repeatedly transmitted from the terminal device 120 to the network device 110, there may also be no need to repeatedly transmit the associated ACK/NACK fields from the terminal device 120 to the network device 110. In addition, for a PDSCH and/or a PDCCH which is not configured or preconfigured to be repeatedly transmitted from the network device 110 to the terminal device 120, the ACK/NACK field for the PDSCH and/or PDCCH can alternatively be configured or preconfigured to be repeatedly transmitted from the terminal device 120 to the network device 110.

With reference to both FIGS. 2 and 6, the first control information 215 and the second control information 225 can be transmitted in the second slot 620 using the same set of resources. In the example of FIG. 6, the first control information 215 is a part of the previous control information 205. In particular, the first control information 215 may not include the NACK indication for the slot 612 in which no downlink transmission is received by the terminal device 120, and also not include the ACK/NACK indication for the slot 602 in which the downlink transmission does not need a repetition of the transmission of related ACK/NACK indication.

Accordingly, the terminal device 120 may generate the first control information 215 to include a first set of ACK/NACK indications 645 for a first set of downlink transmissions (for example, the PDSCH2) whose ACK/NACK indications are configured to be repeatedly transmitted from the terminal device 120 to the network device 110, which is different from the previous set of ACK/NACK indications 640. In this way, since only ACK/NACK indications which are configured to be repeated are included in the first control information 215, the signaling overhead for the first control information 215 can be further reduced.

As further shown in FIG. 6, with a semi-static HARQ-ACK codebook, the terminal device 120 may be also configured with a set of K1 values {3, 6, 8} for transmitting HARQ-ACK indications to the network device 110 in the second slot 620. That is, for the second slot 620, the terminal device 120 can generate a HARQ-ACK codebook including a HARQ-ACK indication for the downlink transmission in the slot 614 which has an offset of three (3) slots from the second slot 620, a HARQ-ACK indication for the downlink transmission in the slot 608 which has an offset of six (6) slots from the second slot 620, and a HARQ-ACK indication for the downlink transmission in the slot 604 which has an offset of eight (8) slots from the second slot 620.

In the example of FIG. 6, the slot 608 is used for uplink transmissions rather than downlink transmissions. Accordingly, the terminal device 120 may generate the second control information 225 to include a second set of ACK/NACK indications 650 for a second set of slots 604 and 614 for downlink transmissions. In this way, the second control information 225 can be generated based on a semi-static HARQ-ACK codebook, and thus the size of the HARQ-ACK codebook can be fixed and the ambiguity of HARQ-ACK indications between the network device 110 and the terminal device 120 can be eliminated. In addition, since the counter DAI and total DAI do not need to be indicated to the terminal device 120, the complexity of the scheduling signaling for downlink transmissions can be reduced. Alternatively, if the terminal device 120 employs a dynamic HARQ-ACK codebook to generate the second set of ACK/NACK indications, the signaling overhead of the HARQ-ACK codebook can be reduced.

Then, the terminal device 120 may transmit the first control information 215 and the second control information 225 using the same set of resources in the second slot 620, for example, the same set of resources for a PUCCH or PUSCH in the second slot 620. In some embodiments, in order to transmit the first control information 215 and the second control information 225 using the same set of resources, the terminal device 120 can generate a combined HARQ-ACK codebook 660, which may include the first set of ACK/NACK indications 645 and the second set of ACK/NACK indications 650. In the example of FIG. 6, the first set of ACK/NACK indications 645 may also be referred to as a compressed repeated part of the combined HARQ-ACK codebook 660, and the second set of ACK/NACK indications 650 may also be referred to as a scheduled part of the combined HARQ-ACK codebook 660.

Although FIG. 6 shows that the second set of ACK/NACK indications 650 is immediately before the first set of ACK/NACK indications 645 in one HARQ-ACK codebook, this is only for example without suggesting any limitation. In other embodiments, the first set of ACK/NACK indications 645 may be before the second set of ACK/NACK indications 650, the first set of ACK/NACK indications 645 and the second set of ACK/NACK indications 650 can be separated by other information and may be included in separated HARQ-ACK codebooks.

In the example of FIG. 6, at the receiving side, since the content of the first control information 215 and the second control information 225 is configured or preconfigured by the network device 110, the network device 110 may determine that the first control information 215 includes the first set of ACK/NACK indications 645 for the first set of downlink transmissions whose ACK/NACK indications are configured to be repeatedly transmitted. Also, the network device 110 may determine that the second control information 225 includes the second set of ACK/NACK indications 650 for a second set of slots 604 and 614 for downlink transmissions. Alternatively, if a dynamic HARQ-ACK codebook is employed to generate the second set of ACK/NACK indications, the network device 110 may determine that the second control information 225 includes the second set of ACK/NACK indications for downlink transmissions transmitted by the network device 110.

In some embodiments, the terminal device 120 may transmit uplink control information (represented as U1) (for example, the control information can include feedback information (such as HARQ-ACK indications), CSI (such as, CQI, PMI, RI, and the like), SR, L1-RSRP, L1-SINR and/or other potential control information) in a first or a first set of PUCCH or PUSCH (represented as S1) to the network device 110 repeatedly within the duration from slot n to slot n+K. For example, n is a non-negative integer. For example, $0 \leq n \leq 160$. For another example, n may be determined according to the description in above regarding Table 1 and Table 2. For example, K is a non-negative integer. For example, $0 \leq K \leq 16$. In some embodiments, the uplink control information may be repeated within a slot and/or in different slots. In some embodiments, the terminal device 120 may transmit an uplink transmission (represented as U2) in a second or a second set of PUCCH or PUSCH (represented as S2) to the network device 110 in slot X. For example, X is an integer and $n \leq X \leq n+K$. For example, the uplink transmission may be further uplink control information in addition to the uplink control information represented as U1. For another example, the uplink transmission may be an uplink data transmission. For another example, the uplink transmission is not a retransmission of an uplink data. In some embodiments, if U1 and U2 are within one slot and/or U1 and U2 overlap in time domain (for example, at least one symbol of U1 overlaps with at least one symbol of U2) and/or S1 and S2 are within one slot and/or S1 and S2 overlap in time domain (for example, at least one symbol of S1 overlaps with at least one symbol of S2), the content of U1 is multiplexed or combined or added in U2. For example, U1 is multiplexed or combined or added at the beginning or ending of U2.

In some embodiments, the terminal device 120 may transmit a plurality of repetitions of uplink control information (represented as U1) (for example, the control information can include feedback information (such as HARQ-ACK indications), CSI (such as, CQI, PMI, RI, and the like), SR, L1-RSRP, L1-SINR and/or other potential control information) in a first or a first set of PUCCH or PUSCH (represented as S1) to the network device 110. In some embodiments, the number of repetitions may be configured as M, where M is a positive integer. For example, 1≤M≤32. The terminal device 120 may transmit N repetitions to the network device 110, where N is a non-negative integer and N is not greater than M. For example, 0≤N≤M. For example, the network device 110 may indicate the terminal device 120 to terminate the repetitions. For another example, if the time domain and/or frequency domain resource for transmission of one repetition overlaps with other resources (for example, downlink resources or other uplink transmissions with higher priority), the transmission of this repetition may be dropped.

Hereinbefore, some embodiments are described in which the first information 215 and the second information 225 are transmitted using a same set of resources in the second slot. In some other embodiments, the first control information 215 and the second control information 225 can be alternatively transmitted using different sets of resources in the second slot which are non-overlapped in time domain. In some further embodiments, the terminal device 120 can drop one of the first information 215 and the second information 225 if the sets of resources for transmitting them are overlapped in time domain. Such various embodiments will be described below with reference to FIG. 7.

Figure 7:
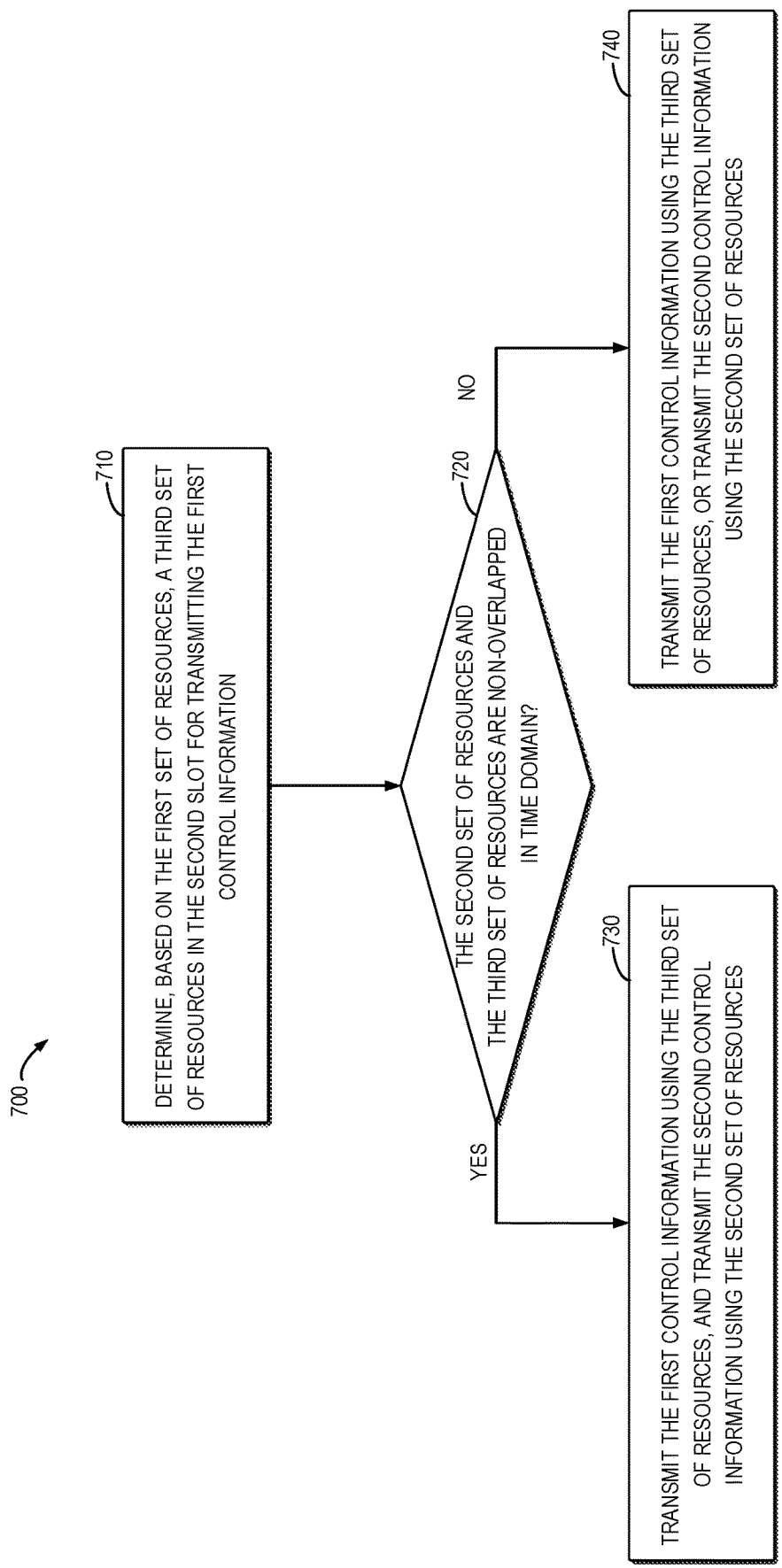
FIG. 7 illustrates a flowchart of an example process for transmitting at least one of first control information and second control information in accordance with some embodiments of the present disclosure.

FIG. 7 illustrates a flowchart of an example process 700 for transmitting at least one of the first control information 215 and the second control information 225 in accordance with some embodiments of the present disclosure. In some embodiments, the process 700 can be implemented at a terminal device, such as the terminal device 120 as shown in FIG. 1. Additionally or alternatively, the process 700 can also be implemented at other terminal devices not shown in FIG. 1. For the purpose of discussion, the process 700 will be described as performed by the terminal device 120 with reference to FIGS. 1 and 2 without loss of generality.

In the following, the set of resources in the first slot for transmitting the previous control information 205 may be referred to as a first set of resources, and the set of resources in the second slot determined by the terminal device 120 for transmitting the second control information 225 may be referred to as a second set of resources. With reference to both FIGS. 2 and 7, in transmitting 270 at least one of the first control information 215 and the second control information 225 to the network device 110, the terminal device 120 can particularly perform the process 700.

At block 710, based on the first set of resources in the first slot for transmitting the previous control information 205, the terminal device 120 may determine a third set of resources in the second slot for transmitting the first control information 215. For example, the terminal device 120 may be configured or preconfigured to determine the third set of resources as the resources located in the second slot at the same positions of the first set of resources in the first slot. However, in some other embodiments, the terminal device 120 may determine the third set of resources based on the first set of resources according to another suitable rule, for example, there may be a predefined offset in time domain between the relative positions of the first set of resources in the first slot and the relative positions of the third set of resources in the second slot. In some further embodiments, the terminal device 120 may determine the third set of resources independently of the first set of resources.

At block 720, the terminal device 120 can determine whether the second set of resources for transmitting the second control information 225 and the third set of resources for transmitting the first control information 215 are non-overlapped in time domain. For example, the terminal device 120 may determine whether the second set of resources and the third set of resources share one or more common symbols in the second slot. If the second set of resources and the third set of resources have one or more common symbols, then they are overlapped in time domain. Otherwise, the second set of resources and the third set of resources are non-overlapped in time domain. In some other embodiments, the terminal device 120 can determine whether the second set of resources and the third set of resources are non-overlapped in time domain by comparing a start time point and an end time point of the second set of resources with a start time point and an end time point of the third set of resources.

At block 730, if the second set of resources and the third set of resources are non-overlapped in time domain, the terminal device 120 may transmit the first control information 215 using the third set of resources and transmit the second control information 225 using the second set of resources. In this way, both the first control information 215 and the second control information 225 can be transmitted using separate sets of resources in the second slot, thereby enhancing coverage of the first control information 215 and improving the reliability and robustness of transmissions of control information in the communication system 100.

At block 740, if the second set of resources and the third set of resources are overlapped in time domain, the terminal device 120 may transmit the first control information 215 using the third set of resources, and drop the second control information 225. Alternatively, the terminal device 120 may transmit the second control information 225 using the second set of resources, and drop the first control information 215. In other words, the terminal device 120 may transmit one of the first control information 215 and the second control information 225, and drop the other one of the first control information 215 and the second control information 225, so as to ensure the performance of the transmitted control information and reduce the complexity of the terminal device 120 for transmitting both the first control information 215 and the second control information 225 using overlapped sets of resources.

For example, the terminal device 120 can compare a priority of the first control information 215 and a priority of the second control information 225. Then, the terminal device 120 can transmit the one with a higher priority and drop the other one with a lower priority. As such, performance of the transmission of one of the first control information 215 and the second control information 225 can be ensured by dropping the transmission of the other one of the first control information 215 and the second control information 225.

With reference to both FIGS. 2 and 7, at the receiving side, in receiving 280 at least one of the first control information 215 and the second control information 225, the network device 110 may determine, based on the first set of resources, the third set of resources in the second slot for receiving the first control information 215 in a similar manner as described above for the terminal device 120. Then, the network device 110 may determine whether the second set of resources and the third set of resources are non-overlapped in time domain in a similar manner as described above for the terminal device 120.

If the second set of resources and the third set of resources are non-overlapped in time domain, the network device 110 may receive the first control information 215 using the third set of resources, and receive the second control information 225 using the second set of resources. Otherwise, if the second set of resources and the third set of resources are overlapped in time domain, the network device 110 may receive the first control information 215 using the third set of resources without receiving the second control information 225. Alternatively, the network device 110 may receive the second control information 225 using the second set of resources without receiving the first control information 215. The terminal device 120 and the network device 110 can determine, based on a same predetermined rule, which one of the first control information 215 and the second control information 225 is to be transmitted or received.

In the example of FIG. 7, the terminal device 120 may drop one of the first control information 215 and the second control information 225 if the sets of resources for transmitting them are overlapped in time domain. In some embodiments, the terminal device 120 may drop the overlapped symbols of the first control information 215 if the sets of resources for the first control information 215 and the sets of resources for the second control information 225 are overlapped in time domain. For example, the remaining symbols for the first control information 215 which are not overlapped with the resource for the second control information 225 in time domain can be transmitted. In some embodiments, the terminal device 120 may drop the overlapped symbols of the second control information 225 if the sets of resources for the first control information 215 and the sets of resources for the second control information 225 are overlapped in time domain. For example, the remaining symbols for the second control information 225 which are not overlapped with the resource for the first control information 215 in time domain can be transmitted.

Alternatively, in some other embodiments, instead of dropping one of the first control information 215 and the second control information 225, the terminal device 120 can transmit both the first control information 215 and the second control information 225 by applying an offset in time domain to one or both of the third set of resources for transmitting the first control information 215 and the second set of resources for transmitting the second control information 225, so as to ensure the performance of the transmitted control information and reduce the complexity of the terminal device 120 for transmitting both the first control information 215 and the second control information 225 using overlapped sets of resources. In some embodiments, the offset may be F symbols, where F is a positive integer. For example, $0 \leq F \leq 14$. In some embodiments, the offset may be configured by the network device 110. In some embodiments, the offset may be predefined. In some embodiments, the value of F may be based on the UE capability, for example, the capability of the terminal device 120.

In particular, the terminal device 120 may transmit the first control information 215 and the second control information 225 based on a comparison of available resources in the second slot with the second set of resources and the third set of resources in time domain. At the receiving side, the network device 110 can accordingly receive the first control information 215 and the second control information 225 based on the comparison of available resources in the second slot with the second set of resources and the third set of resources in time domain. In this way, the terminal device 120 can reasonably select to transmit the first control information 215 and the second control information 225 to the network device 110 in one slot or in separate slots. Such embodiments will be described below in detail with reference to FIG. 8.

Figure 8:
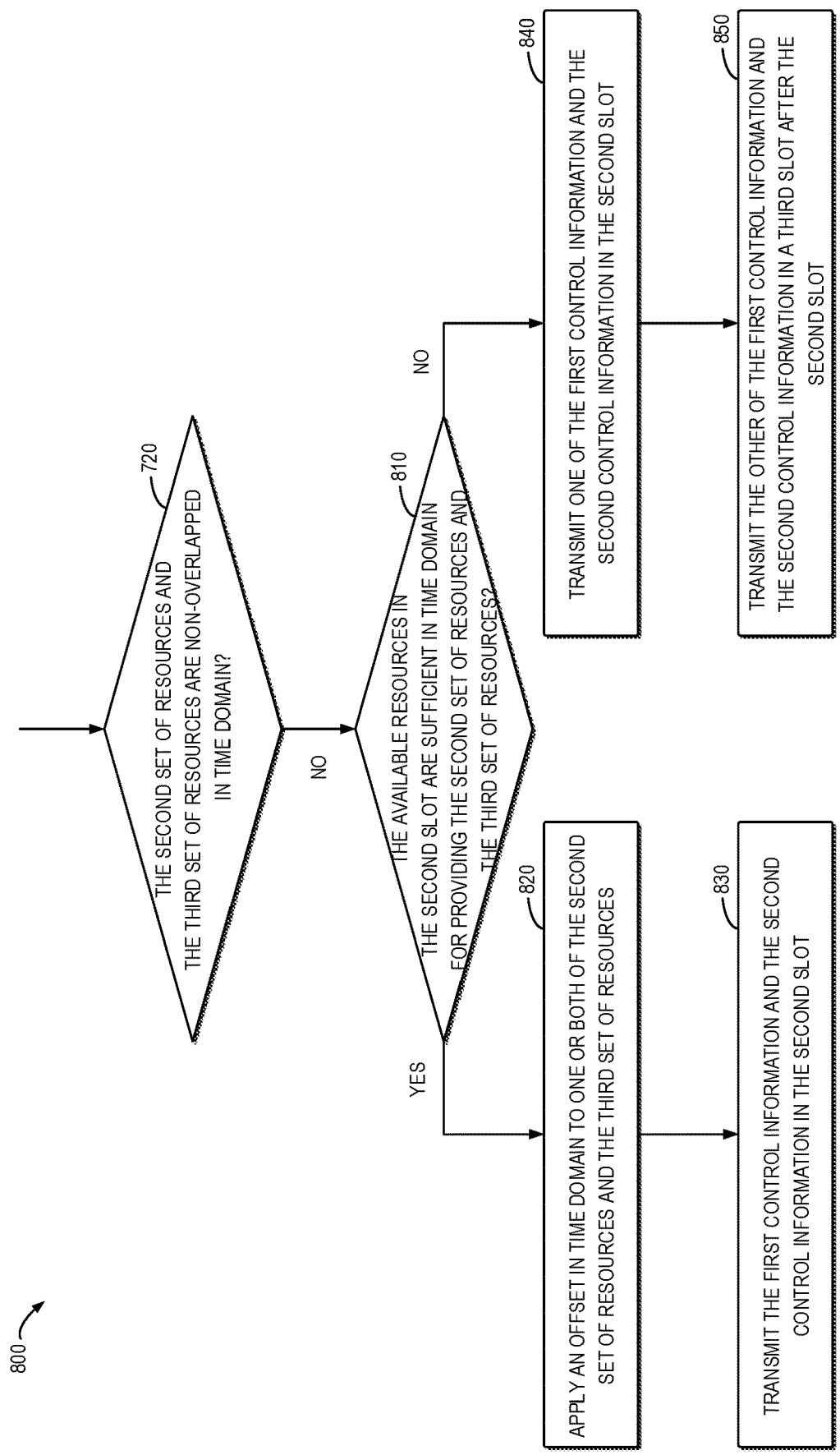
FIG. 8 illustrates a flowchart of an example process for transmitting first control information and second control information in accordance with some embodiments of the present disclosure.

FIG. 8 illustrates a flowchart of an example process 800 for transmitting the first control information 215 and the second control information 225 in accordance with some embodiments of the present disclosure. In some embodiments, the process 800 can be implemented at a terminal device, such as the terminal device 120 as shown in FIG. 1. Additionally or alternatively, the process 800 can also be implemented at other terminal devices not shown in FIG. 1. For the purpose of discussion, the process 800 will be described as performed by the terminal device 120 with reference to FIGS. 1 and 7 without loss of generality.

As shown, FIG. 8 may be considered as a substitute for the "NO" branch of the block 720 in the example process 700 of FIG. 7. As described above with reference to FIG. 7, at block 720, the terminal device 120 can determine whether the second set of resources for transmitting the second control information 225 and the third set of resources for transmitting the first control information 215 are non-overlapped in time domain.

If the second set of resources and the third set of resources are overlapped in time domain, at block 810, the terminal device 120 can determine whether the available resources in the second slot are sufficient in time domain for providing the second set of resources and the third set of resources. For example, the terminal device 120 can determine whether there are sufficient continuous uplink symbols in the second slot for both the second set of resources and the third set of resources. In some embodiments, there may be a minimum value of time interval T between the second set of resource and the third set of resources, and T is a non-negative integer. For example, $0 \leq T \leq 14$. For example, T is predefined. For another example, T is based on the UE capability, such as the capability of the terminal device 120. For another example, T is configured by the network device 110. In some other embodiments, the terminal device 120 can determine whether the available resources in the second slot are sufficient in any other suitable manners. For example, the terminal device 120 can determine whether unoccupied duration in the second slot is longer than the duration of the second set of resources and the third set of resources in time domain.

In some embodiments, if the available resources in the second slot are sufficient in time domain for providing the second set of resources and the third set of resources, at block 820, the terminal device 120 may apply an offset in time domain to one or both of the second set of resources and the third set of resources within the second slot, so that the two sets of resources are non-overlapped in time domain after applying the offset. Then, at block 830, the terminal device 120 may transmit the first control information 215 and the second control information 225 in the second slot using the two non-overlapped sets of resources, respectively. In some embodiments, the network device 110 may configure an offset F to the terminal device 120, where F is a positive integer. For example, $0 \leq F \leq 14$. This offset within the second slot may also be referred to as symbol level offset, which will be further described later with reference to FIGS. 9A-9C.

If the available resources in the second slot are insufficient in time domain for providing the second set of resources and the third set of resources, at block 840, the terminal device 120 may transmit one of the first control information 215 and the second control information 225 in the second slot. At block 850, the terminal device 120 may transmit the other one of the first control information 215 and the second control information 225 in a third slot after the second slot. In other words, the set of resources for transmitting one of the first control information 215 and the second control information 225 is applied a slot level offset, which will be further described later with reference to FIGS. 10A and 10B.

It should be noted that although in FIG. 8 the slot level offset is applied in case the available resources in the second slot are insufficient in time domain for providing the second set of resources and the third set of resources, this is only for example without suggesting any limitations. In some other embodiments, the slot level offset can be applied in case the second set of resources and the third set of resources are overlapped in time domain, regardless of whether the available resources in the second slot are sufficient in time domain for providing the second set of resources and the third set of resources.

Figure 9A:
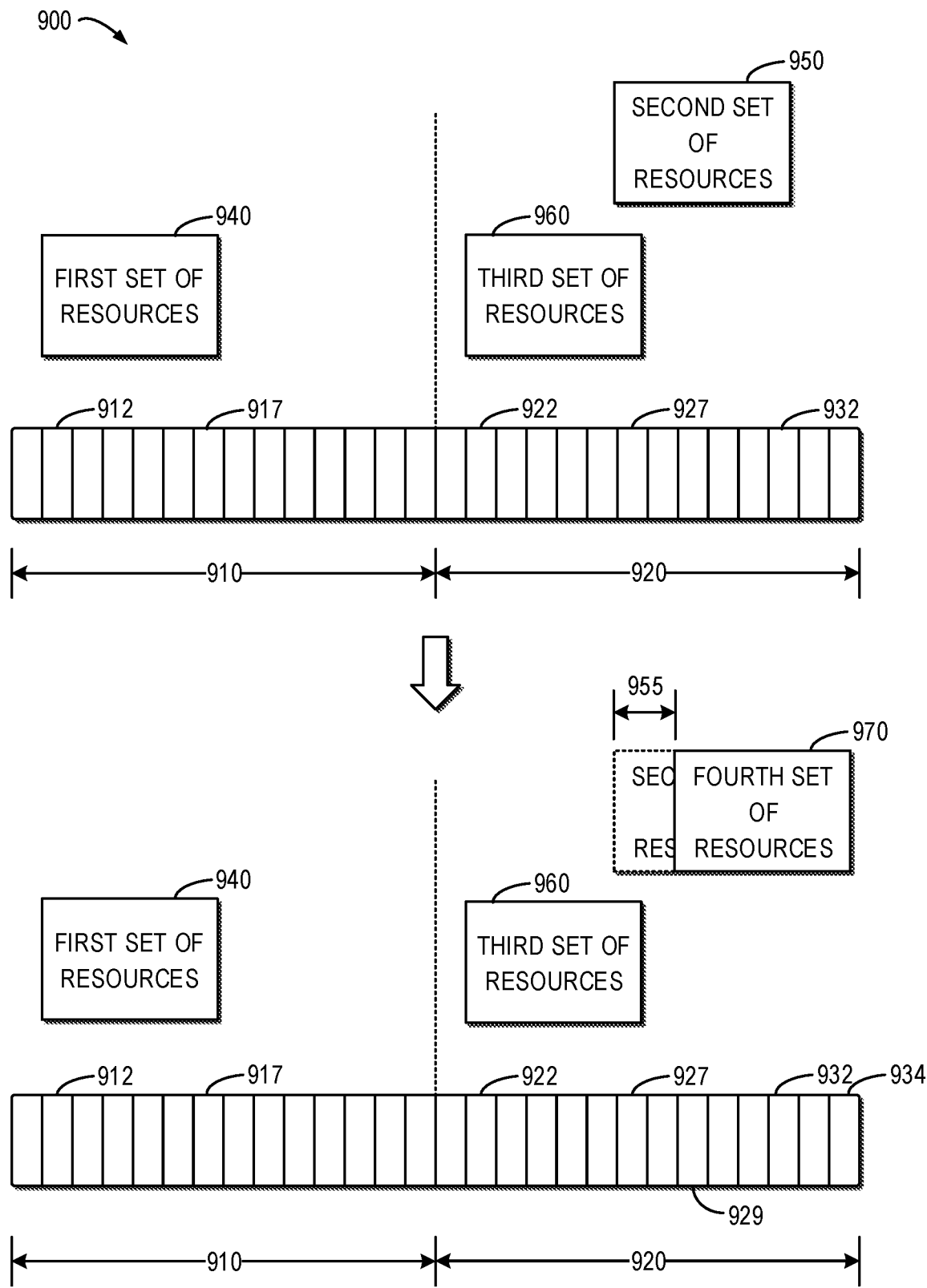
FIG. 9A illustrates an example scenario in which a first offset in time domain is applied to a second set of resources to determine a fourth set of resources for transmitting second control information within a second slot in accordance with some embodiments of the present disclosure.

FIG. 9A illustrates an example scenario 900 in which a first offset 955 in time domain is applied to a second set of resources 950 to determine a fourth set of resources 970 for transmitting the second control information 225 within a second slot 920 in accordance with some embodiments of the present disclosure. In FIG. 9A, it is assumed that a slot 910 is an example of the first slot as discussed herein, and a slot 920 is an example of the second slot as discussed herein. The first slot 910 and the second slot 920 each may include fourteen (14) symbols, in which symbols 912 and 917 in the first slot 910 and symbols 922, 927, 929, 932, and 934 in the second slot 920 are shown for example.

It is noted that the particular number of symbols in one slot as depicted in FIG. 9A is only for example without suggesting any limitations. In some other embodiments, one slot can include any number of symbols. In addition, it is appreciated that although in FIG. 9A the first slot 910 and the second slot 920 are depicted as next to each other, this is only for example without suggesting any limitation. In other embodiments, the first slot and the second slot can be spaced apart from each other.

It is also assumed that the terminal device 120 transmits the previous control information 205 to the network device 110 in the first slot 910 using a first set of resources 940. Based on the first set of resources 940, the terminal device 120 may determine a third set of resources 960 in the second slot 920 for transmitting the first control information 215 which is identical to or part of the previous control information 205. For example, as shown in FIG. 9A, the first set of resources 940 may start at the second symbol 912 and end at the seventh symbol 917 of the first slot 910. In other words, the first set of resources 940 occupies six (6) symbols in the example of FIG. 9A. It is noted that the particular start symbol, the particular end symbol, and the particular number of symbols of the first set of resources 940 are only for example without suggesting any limitations. In some other embodiments, the first set of resources 940 may have any suitable start symbol, any suitable end symbol, and any suitable number of symbols.

Then, at the same position in the second slot 920, the terminal device 120 may determine the third set of resources 960. That is, the third set of resources 960 may start at the second symbol 922 and end at the seventh symbol 927 of the second slot 920. In other words, the third set of resources 960 also occupies six (6) symbols in the example of FIG. 9A. It should be noted that the particular start symbol, the particular end symbol, and the particular number of symbols in the third set of resources 960 are only for example without suggesting any limitations. In some other embodiments, the third set of resources 960 may have any suitable start symbol, any suitable end symbol, and any suitable number of symbols.

It is further assumed that the terminal device 120 determines the second set of resources 950 for transmitting the second control information 225 to the network device 110 in the second slot 920, and the second set of resources 950 may start at the seventh symbol 927 and end at the twelfth symbol 932 of the second slot 920. In other words, the second set of resources 950 also occupies six (6) symbols in the example of FIG. 9A. It is noted that the particular start symbol, the particular end symbol, and the particular number of symbols in the second set of resources 950 are only for example without suggesting any limitations. In some other embodiments, the second set of resources 950 may have any suitable start symbol, any suitable end symbol, and any suitable number of symbols.

Then, the terminal device 120 can determine that the second set of resources 950 and the third set of resources 960 are overlapped in time domain. For example, the terminal device 120 may determine that the second set of resources 950 and the third set of resources 960 have a common symbol 927. Accordingly, the terminal device 120 may determine that an offset may need to be applied to one or both of the second set of resources 950 and the third set of resources 960 for transmitting the first control information 215 and the second control information 225.

Afterwards, the terminal device 120 may determine whether the available resources in the second slot 920 are sufficient in time domain for providing the second set of resources 950 and the third set of resources 960. For example, in FIG. 9A, it is assumed that the second slot 920 has fourteen (14) available symbols, which are sufficient in time domain for providing the second set of resources 950 (6 symbols in this example) and the third set of resources 960 (6 symbols in this example). It is noted that the particular number of the available symbols in the second slot 920 is only for example without suggesting any limitations. In some other embodiments, the second slot 920 may have any suitable number of available symbols.

Accordingly, as shown in the lower part of FIG. 9A, the terminal device 120 may determine the fourth set of resources 970 in the second slot 920 by applying the first offset 955 in time domain to the second set of resources 950, such that the third set of resources 960 and the fourth set of resources 970 are non-overlapped in time domain. In the example of FIG. 9A, the first offset 955 may be two (2) symbols. In some embodiments, the network device 110 and the terminal device 120 can use a common rule to determine the first offset 955. For example, the network device 110 and the terminal device 120 may predetermine that the third set of resources 960 and the fourth set of resources 970 need to be spaced apart from each other by one symbol. Then, the network device 110 and the terminal device 120 can calculate the number of symbols in the offset that needs to be applied to the second set of resources 950.

Then, the terminal device 120 may transmit the first control information 215 using the third set of resources 960, and transmit the second control information 225 using the fourth set of resources 970. In this way, both the first control information 215 and the second control information 225 can be transmitted using non-overlapped sets of resources in the second slot 920, thereby enhancing coverage of the first control information 215 and improving the reliability and robustness of transmissions of control information in the communication system 100. In addition, since only one set of resources is applied with an offset in time domain, the complexity of determining (by the terminal device 120 and the network device 110) the set of resources after applying the offset may be minimized.

At the receiving side, with reference to FIGS. 8 and 9A, in receiving the first control information 215 and the second control information 225 based on the comparison, if the available resources in the second slot 920 are sufficient in time domain for providing the second set of resources 950 and the third set of resources 960, the network device 110 may determine the fourth set of resources 970 in the second slot 920 by applying the first offset 955 in time domain to the second set of resources 950, such that the third set of resources 960 and the fourth set of resources 970 are non-overlapped in time domain. Then, the network device 110 may receive the first control information 215 using the third set of resources 960, and receive the second control information 225 using the fourth set of resources 970.

In the example of FIG. 9A, the offset in time domain is applied to the second set of resources 950 to obtain the fourth set of resources 970 which is non-overlapped with the third set of resources 960. In other embodiments, the terminal device 120 may alternatively apply an offset in time domain to the third set of resources 960 to obtain a set of resources which is non-overlapped with the second set of resources 950, so that the terminal device 120 can transmit the first control information 215 and the second control information 225 using non-overlapped sets of resources in the second slot 920. Such embodiments will be further described below with reference to FIG. 9B.

Figure 9B:
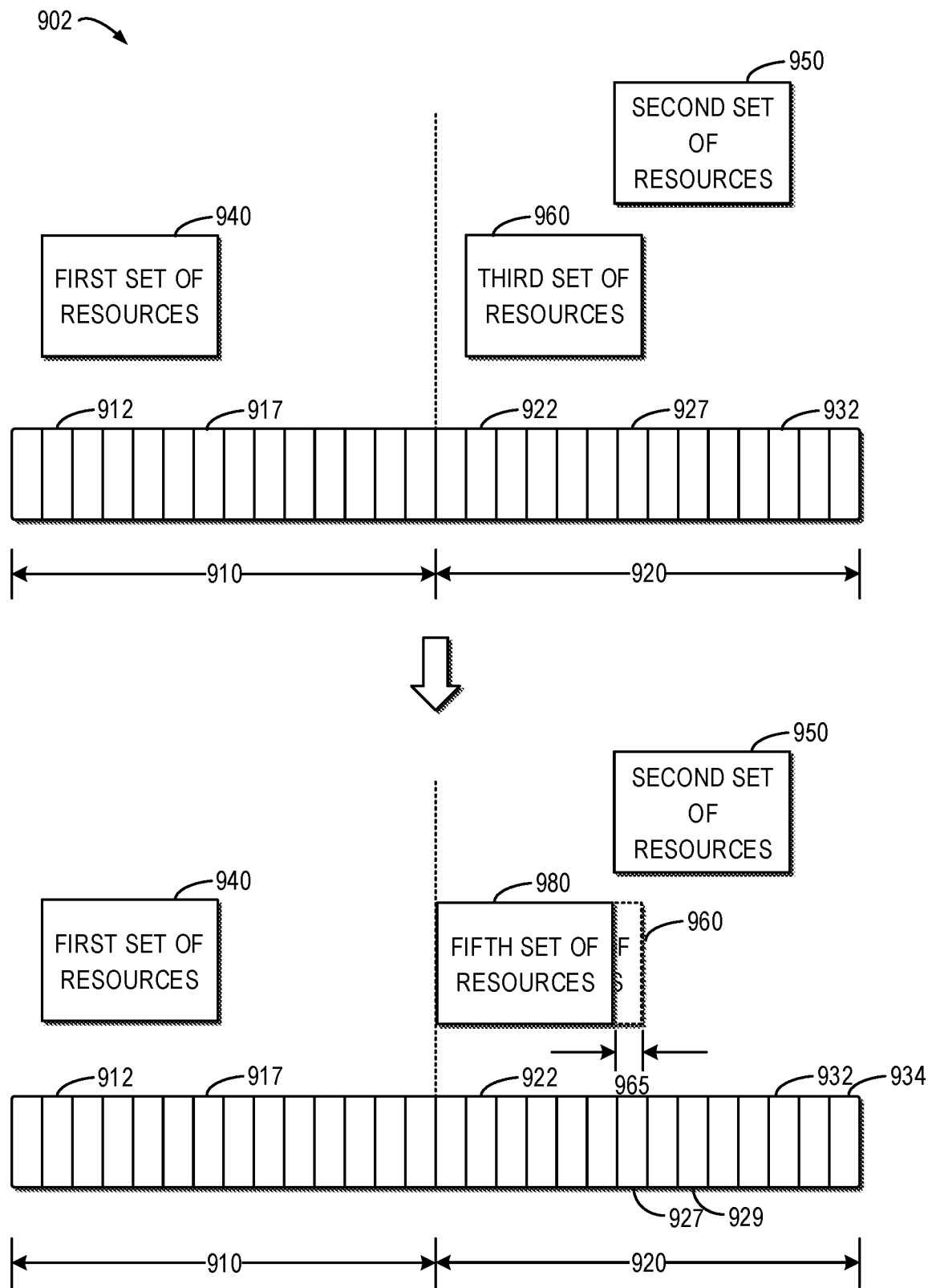
FIG. 9B illustrates another example scenario in which a second offset in time domain is applied to a third set of resources to determine a fifth set of resources for transmitting first control information within a second slot in accordance with some embodiments of the present disclosure.

FIG. 9B illustrates another example scenario 902 in which a second offset 965 in time domain is applied to the third set of resources 960 to determine a fifth set of resources 980 for transmitting the first control information 215 within the second slot 920 in accordance with some embodiments of the present disclosure. Different from the example of FIG. 9A, as shown in the lower part of FIG. 9B, after determining that the available resources in the second slot 920 are sufficient in time domain for providing the second set of resources 950 and the third set of resources 960, the terminal device 120 may determine a fifth set of resources 980 in the second slot 920 by applying the second offset 965 in time domain to the third set of resources 960, such that the second set of resources 950 and the fifth set of resources 980 are non-overlapped in time domain.

In the example of FIG. 9B, the second offset 965 may be one (1) symbol. In some embodiments, the network device 110 and the terminal device 120 can use a common rule to determine the second offset 965. For example, the network device 110 and the terminal device 120 may predetermine that the second set of resources 950 and the fifth set of resources 980 may be next to each other. Then, the network device 110 and the terminal device 120 can calculate the number of symbols in the offset that needs to be applied to the third set of resources 960.

Then, the terminal device 120 may transmit the first control information 215 using the fifth set of resources 980, and transmit the second control information 225 using the second set of resources 950. In this way, both the first control information 215 and the second control information 225 can be transmitted using non-overlapped sets of resources in the second slot 920, thereby enhancing coverage of the first control information 215 and improving the reliability and robustness of transmissions of control information in a communication system. In addition, since only one set of resources is applied with an offset in time domain, the complexity of determining (by the terminal device 120 and the network device 110) the set of resources after applying the offset may be minimized.

At the receiving side, with reference to FIGS. 8 and 9B, in receiving the first control information 215 and the second control information 225 based on the comparison, if the available resources in the second slot 920 are sufficient in time domain for providing the second set of resources 950 and the third set of resources 960, the network device 110 may determine the fifth set of resources 980 in the second slot 920 by applying the second offset 965 in time domain to the third set of resources 960, such that the second set of resources 950 and the fifth set of resources 980 are non-overlapped in time domain. Then, the network device 110 may receive the first control information 215 using the fifth set of resources 980, and receive the second control information 225 using the second set of resources 950.

In the examples of FIGS. 9A and 9B, the offset in time domain is applied to one of the second set of resources 950 and the third set of resources 960 to obtain a set of resources after applying the offset, which is non-overlapped with the other one of the second set of resources 950 and the third set of resources 960. In other embodiments, the terminal device 120 may alternatively apply respective offsets in time domain to the second set of resources 950 and the third set of resources 960 to obtain two sets of resources which are non-overlapped with each other in time domain, so that the terminal device 120 can transmit the first control information 215 and the second control information 225 using the two non-overlapped sets of resources. Such embodiments will be further described below with reference to FIG. 9C.

Figure 9C:
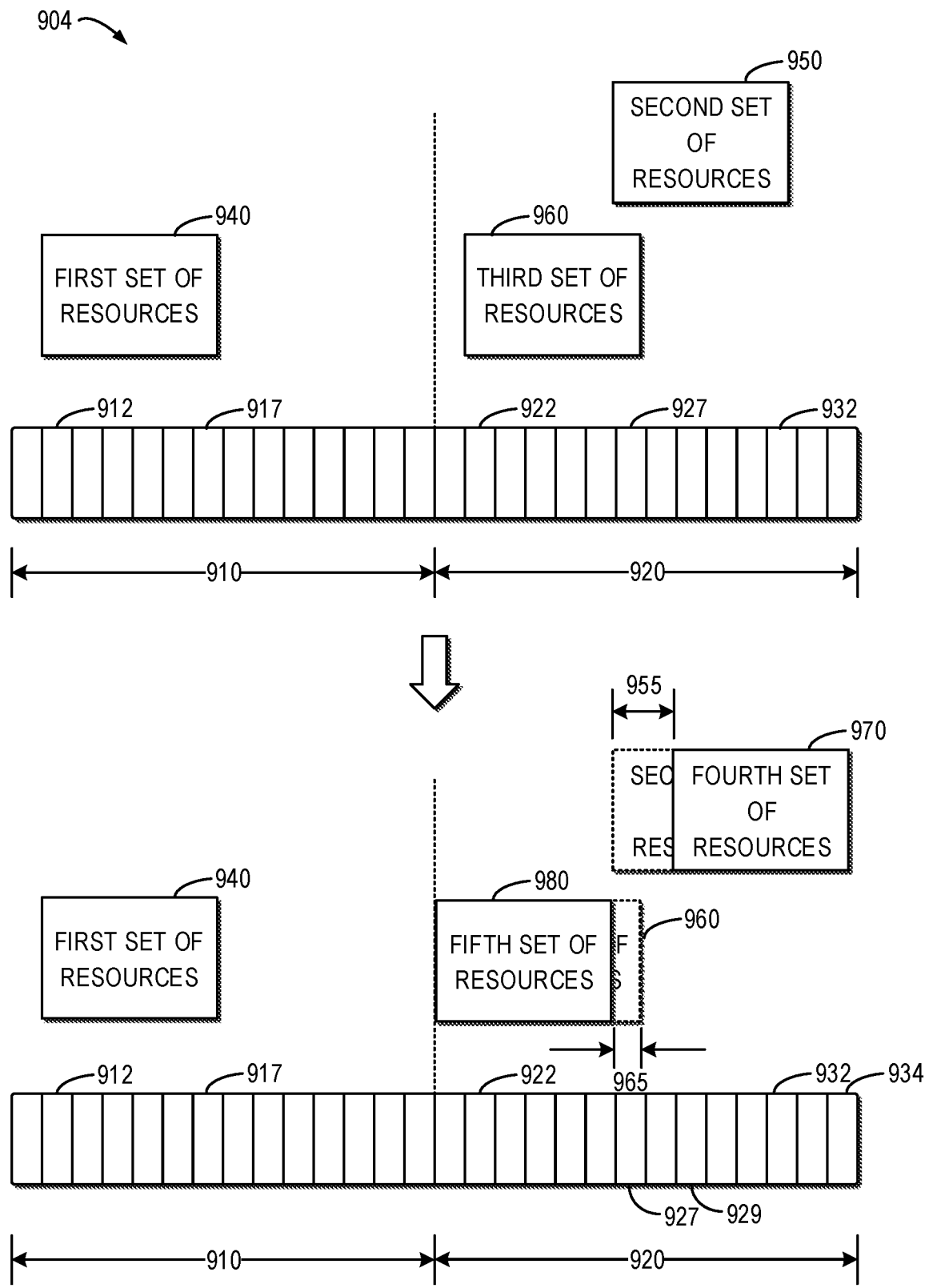
FIG. 9C illustrates a further example scenario in which two offsets in time domain are applied to second set of resources and third set of resources, respectively, for transmitting first control information and second control information within a second slot in accordance with some embodiments of the present disclosure.

FIG. 9C illustrates a further example scenario 904 in which two offsets 955 and 965 in time domain are applied to the second set of resources 950 and the third set of resources 960, respectively, for transmitting the first control information 215 and the second control information 225 within the second slot 920 in accordance with some embodiments of the present disclosure. Different from the examples of FIGS. 9A and 9B, as shown in the lower part of FIG. 9C, after determining that the available resources in the second slot 920 are sufficient in time domain for providing the second set of resources 950 and the third set of resources 960, the terminal device 120 may determine the fourth set of resources 970 in the second slot 920 by applying the first offset 955 in time domain to the second set of resources 950. In addition, the terminal device 120 may determine the fifth set of resources 980 in the second slot 920 by applying the second offset 965 in time domain to the third set of resources 960, such that the fourth set of resources 970 and the fifth set of resources 980 are non-overlapped in time domain.

In the example of FIG. 9C, the first offset 955 may be two (2) symbols and the second offset 965 may be one (1) symbol. In some embodiments, the network device 110 and the terminal device 120 can use a common rule to determine the first offset 955 and the second offset 965. For example, the network device 110 and the terminal device 120 may predetermine that the second set of resources 950 and the fifth set of resources 980 may be spaced apart with each other by three (3) symbols. Then, the network device 110 and the terminal device 120 can calculate the number of symbols in the respective offsets that need to be applied to the second set of resources 950 and the third set of resources 960. For example, the rule may further indicate that the first offset 955 and the second offset 965 need to be as equal to each other as possible, and if not, the first offset 955 may be greater than the second offset 965.

Then, the terminal device 120 may transmit the first control information 215 using the fifth set of resources 980, and transmit the second control information 225 using the fourth set of resources 970. In this way, both the first control information 215 and the second control information 225 can be transmitted using non-overlapped sets of resources in the second slot 920, thereby enhancing coverage of the first control information 215 and improving the reliability and robustness of transmissions of control information in a communication system. In addition, since two sets of resources are applied with respective offsets in time domain, it can be ensured that the terminal device 120 and the network device 110 can obtain non-overlapped fourth set of resources 970 and the fifth set of resources 980.

At the receiving side, with reference to FIGS. 8 and 9C, in receiving the first control information 215 and the second control information 225 based on the comparison, if the available resources in the second slot 920 are sufficient in time domain for providing the second set of resources 950 and the third set of resources 960, the network device 110 may determine the fourth set of resources 970 in the second slot 920 by applying the first offset 955 in time domain to the second set of resources 950, and determine the fifth set of resources 980 in the second slot 920 by applying the second offset 965 in time domain to the third set of resources 960, such that the fourth set of resources 970 and the fifth set of resources 980 are non-overlapped in time domain. Then, the network device 110 may receive the first control information 215 using the fifth set of resources 980, and receive the second control information 225 using the fourth set of resources 970.

Figure 10A:
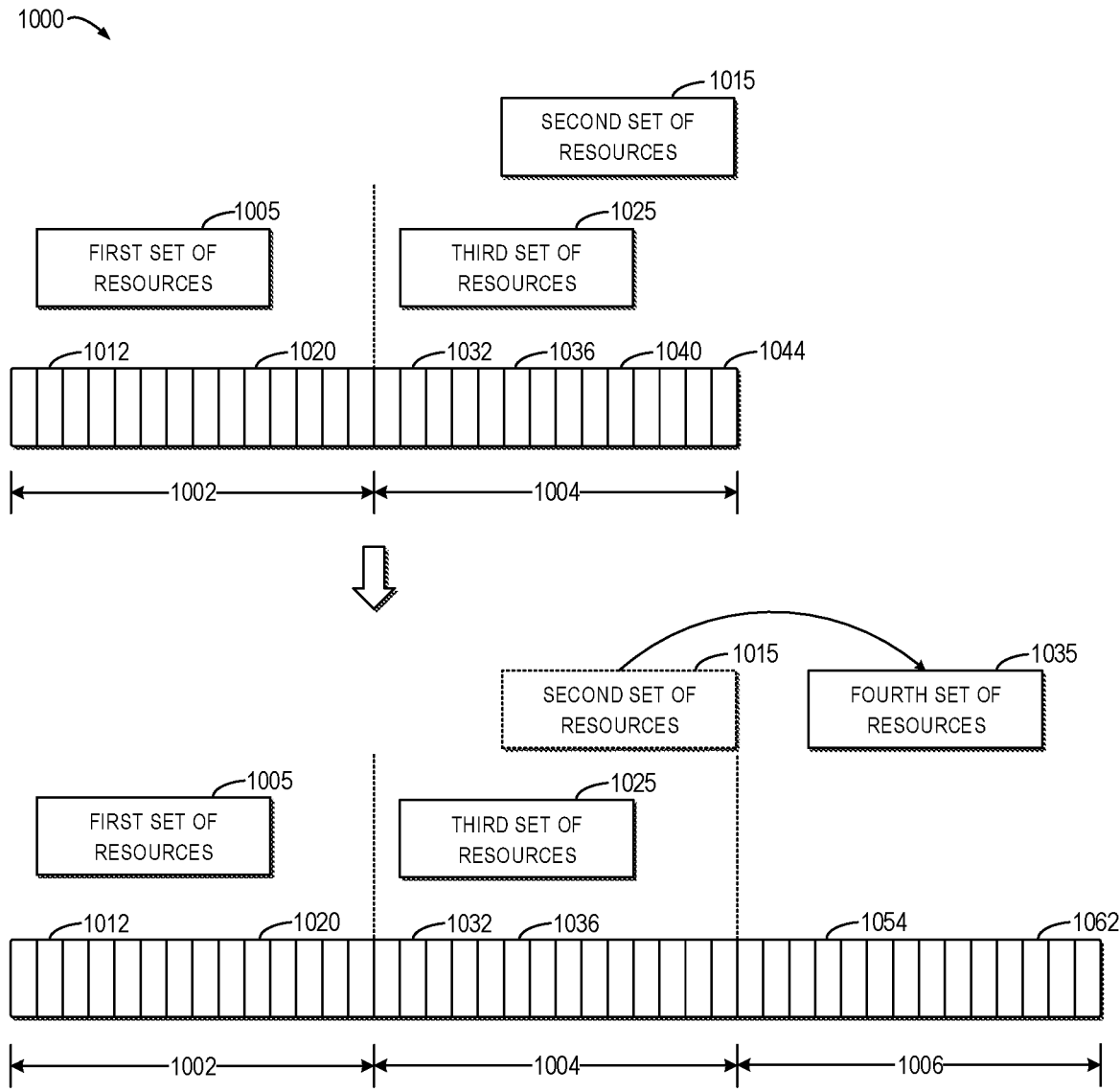
FIG. 10A illustrates an example scenario in which second control information is delayed to be transmitted in a third slot after a second slot in accordance with some embodiments of the present disclosure.

FIG. 10A illustrates an example scenario 1000 in which the second control information 225 is delayed to be transmitted in a third slot 1006 after a second slot 1004 in accordance with some embodiments of the present disclosure. In FIG. 10A, it is assumed that a slot 1002 is an example of the first slot as discussed herein, and a slot 1004 is an example of the second slot as discussed herein. The first slot 1002 and the second slot 1004 each include fourteen (14) symbols, in which symbols 1012 and 1020 in the first slot 1002 and symbols 1032, 1036, 1040 and 1044 in the second slot 1004 are shown for example. It is noted that the particular number of symbols in one slot as depicted in FIG. 10A is only for example without suggesting any limitations. In some other embodiments, one slot can include any number of symbols.

It is also assumed that the terminal device 120 transmits the previous control information 205 to the network device 110 in the first slot 1002 using a first set of resources 1005. Based on the first set of resources 1005, the terminal device 120 may determine a third set of resources 1025 in the second slot 1004 for transmitting the first control information 215 which is identical to or part of the previous control information 205. For example, as shown in FIG. 10A, the first set of resources 1005 may start at the second symbol 1012 and end at the tenth symbol 1020 of the first slot 1002. In other words, the first set of resources 1005 occupies nine (9) symbols in the example of FIG. 10A. It is noted that the particular start symbol, the particular end symbol, and the particular number of symbols of the first set of resources 1005 are only for example without suggesting any limitations. In some other embodiments, the first set of resources 1005 may have any suitable start symbol, any suitable end symbol, and any suitable number of symbols.

Then, at the same position in the second slot 1004, the terminal device 120 may determine the third set of resources 1025. That is, the third set of resources 1025 may start at the second symbol 1032 and end at the tenth symbol 1040 of the second slot 1004. In other words, the third set of resources 1025 also occupies nine (9) symbols in the example of FIG. 10A. It should be noted that the particular start symbol, the particular end symbol, and the particular number of symbols in the third set of resources 1025 are only for example without suggesting any limitations. In some other embodiments, the third set of resources 1025 may have any suitable start symbol, any suitable end symbol, and any suitable number of symbols.

It is further assumed that the terminal device 120 determines a second set of resources 1015 for the second control information 225 to be transmitted to the network device 110 in the second slot 1004, and the second set of resources 1015 may start at the sixth symbol 1036 and end at the fourteenth symbol 1044 of the second slot 1004. In other words, the second set of resources 1015 occupies nine (9) symbols in the example of FIG. 10A. It is noted that the particular start symbol, the particular end symbol, and the particular number of symbols in the second set of resources 1015 are only for example without suggesting any limitations. In some other embodiments, the second set of resources 1015 may have any suitable start symbol, any suitable end symbol, and any suitable number of symbols.

Then, the terminal device 120 can determine that the second set of resources 1015 and the third set of resources 1025 are overlapped in time domain. For example, the terminal device 120 may determine that the second set of resources 1015 and the third set of resources 1025 have five (5) common symbols 1032 to 1040. Accordingly, the terminal device 120 may determine that an offset may need to be applied to one or both of the second set of resources 1015 and the third set of resources 1025 for transmitting the first control information 215 and the second control information 225.

Afterwards, the terminal device 120 may determine whether the available resources in the second slot 1004 are sufficient in time domain for providing the second set of resources 1015 and the third set of resources 1025. For example, in FIG. 10A, it is assumed that the second slot 1004 has fourteen (14) available symbols, which are insufficient in time domain for providing the second set of resources 1015 (9 symbols in this example) and the third set of resources 1025 (9 symbols in this example). It is noted that the particular number of the available symbols in the second slot 1004 are only for example without suggesting any limitations. In some other embodiments, the second slot 1004 may have any suitable number of available symbols.

Accordingly, as shown in the lower part of FIG. 10A, the terminal device 120 may transmit the first control information 215 using the third set of resources 1025, and transmit the second control information 225 in the third slot 1006 after the second slot 1004. For example, the third slot 1006 may be next available uplink slot after the second slot 1004. For example, the terminal device 120 may transmit the second control information 225 using a fourth set of resources 1035, which can start at the fourth symbol 1054 and end at the twelfth symbol 1062 of the third slot 1006. It is appreciated that although in FIG. 10A the first slot 1002, the second slot 1004, and the third slot 1006 are depicted as next to one another, this is only for example without suggesting any limitation. In other embodiments, the first slot, the second slot, and the third slot can be spaced apart from one another.

In this way, the first control information 215 and the second control information 225 can be transmitted in different slots, thereby enhancing coverage of the first control information 215 and improving the reliability and robustness of transmissions of control information in the communication system 100. In addition, since only one set of resources is applied with a slot level offset in time domain, the complexity of determining (by the terminal device 120 and the network device 110) the set of resources after applying the slot level offset may be minimized.

In addition, it should be noted that FIG. 10A depicts that the slot level offset is applied in case the available resources in the second slot 1004 are insufficient in time domain for providing the second set of resources 1015 and the third set of resources 1025. However, in some other embodiments, the slot level offset can be applied in case the second set of resources 1015 and the third set of resources 1025 are overlapped in time domain, regardless of whether the available resources in the second slot 1004 are sufficient in time domain for providing the second set of resources 1015 and the third set of resources 1025.

At the receiving side, with reference to FIGS. 8 and 10A, in receiving the first control information 215 and the second control information 225 based on the comparison, if the available resources in the second slot 1004 are insufficient in time domain for providing the second set of resources 1015 and the third set of resources 1025, the network device 110 may receive the first control information 215 using the third set of resources 1025, and receive the second control information 225 in the third slot 1006 after the second slot 1004.

In some embodiments, if third control information (not shown) is also to be transmitted from the terminal device 120 to the network device 110 in the third slot 1006, the terminal device 120 may transmit the second control information 225 and the third control information using the same set of resources in the third slot 1006, for example, the fourth set of resources 1035. In other words, the second control information 225 and the third control information are multiplexed in the fourth set of resources 1035.

As such, both the second control information 225 and the third control information can be reported from the terminal device 120 to the network device 110 without using additional separate set of transmission resources for transmitting the second control information 225. At the receiving side, if the third control information is to be received by the network device 110 from the terminal device 120 in the third slot 1006, the network device 110 may receive the second control information 225 and the third control information using the same set of resources in the third slot 1006.

Alternatively, if the third control information is to be transmitted from the terminal device 120 to the network device 110 in the third slot 1006, the terminal device 120 may transmit the third control information in a fourth slot (not shown) after the third slot 1006. For example, the fourth slot may be next available uplink slot after the third slot 1006. As such, the second control information 225 and the third control information can be transmitted in different slots, thereby improving the reliability and robustness of transmissions of control information. At the receiving side, if the third control information is to be received by the network device 110 from the terminal device 120 in the third slot 1006, the network device 110 may receive the third control information in the fourth slot after the third slot 1006.

In the example of FIG. 10A, the second control information 225 is delayed to be transmitted in the third slot 1006. In other embodiments, the terminal device 120 may alternatively delay the first control information 215 to be transmitted in the third slot 1006. Such embodiments will be further described below with reference to FIG. 10B.

Figure 10B:
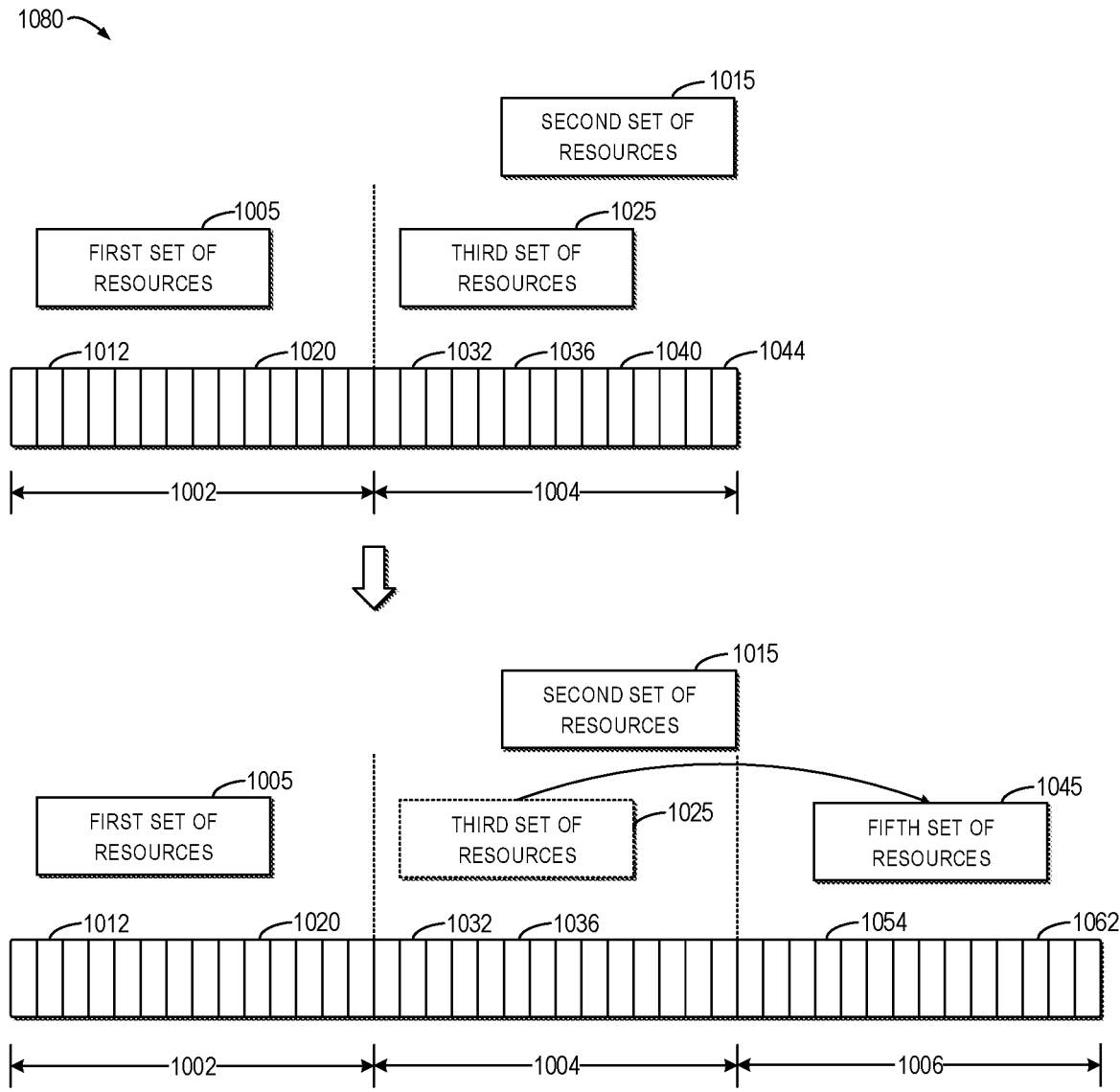
FIG. 10B illustrates another example scenario in which first control information is delayed to be transmitted in a third slot after a second slot in accordance with some embodiments of the present disclosure.

FIG. 10B illustrates an example scenario 1080 in which the first control information 215 is delayed to be transmitted in the third slot 1006 after the second slot 1004 in accordance with some embodiments of the present disclosure. Different from the example of FIG. 10A, as shown in the lower part of FIG. 10B, after determining that the available resources in the second slot 1004 are insufficient in time domain for providing the second set of resources 1015 and the third set of resources 1025, the terminal device 120 may transmit the second control information 225 using the second set of resources 1015, and transmit the first control information 215 in the third slot 1006 after the second slot 1004. For example, the terminal device 120 may transmit the first control information 215 using a fifth set of resources 1045, which can start at the fourth symbol 1054 and end at the twelfth symbol 1062 of the third slot 1006.

In this way, the first control information 215 and the second control information 225 can be transmitted in different slots, thereby enhancing coverage of the first control information 215 and improving the reliability and robustness of transmissions of control information in the communication system 100. In addition, since only one set of resources is applied with a slot offset in time domain, the complexity of determining (by the terminal device 120 and the network device 110) the set of resources after applying the slot level offset may be minimized.

In addition, it should be noted that FIG. 10B depicts that the slot level offset is applied in case the available resources in the second slot 1004 are insufficient in time domain for providing the second set of resources 1015 and the third set of resources 1025. However, in some other embodiments, the slot level offset can be applied in case the second set of resources 1015 and the third set of resources 1025 are overlapped in time domain, regardless of whether the available resources in the second slot 1004 are sufficient in time domain for providing the second set of resources 1015 and the third set of resources 1025.

At the receiving side, with reference to FIGS. 8 and 10B, in receiving the first control information 215 and the second control information 225 based on the comparison, if the available resources in the second slot 1004 are insufficient in time domain for providing the second set of resources 1015 and the third set of resources 1025, the network device 110 may receive the second control information 225 using the second set of resources 1015, and receive the first control information 215 in the third slot 1006 after the second slot 1004.

In some embodiments, if third control information (not shown) is also to be transmitted from the terminal device 120 to the network device 110 in the third slot 1006, the terminal device 120 may transmit the first control information 215 and the third control information using the same set of resources in the third slot 1006, for example, the fifth set of resources 1045. In other words, the first control information 215 and the third control information are multiplexed in the fifth set of resources 1045.

As such, both the first control information 215 and the third control information can be reported from the terminal device 120 to the network device 110 without using additional separate set of transmission resources for transmitting the first control information 215. At the receiving side, if the third control information is to be received by the network device 110 from the terminal device 120 in the third slot 1006, the network device 110 may receive the first control information 215 and the third control information using the same set of resources in the third slot 1006.

Alternatively, if the third control information is to be transmitted from the terminal device 120 to the network device 110 in the third slot 1006, the terminal device 120 may transmit the third control information in a fourth slot (not shown) after the third slot 1006. For example, the fourth slot may be next available uplink slot after the third slot 1006. As such, the first control information 215 and the third control information can be transmitted in different slots, thereby improving the reliability and robustness of transmissions of control information. At the receiving side, if the third control information is to be received by the network device 110 from the terminal device 120 in the third slot 1006, the network device 110 may receive the third control information in a fourth slot after the third slot 1006.

Figure 11:
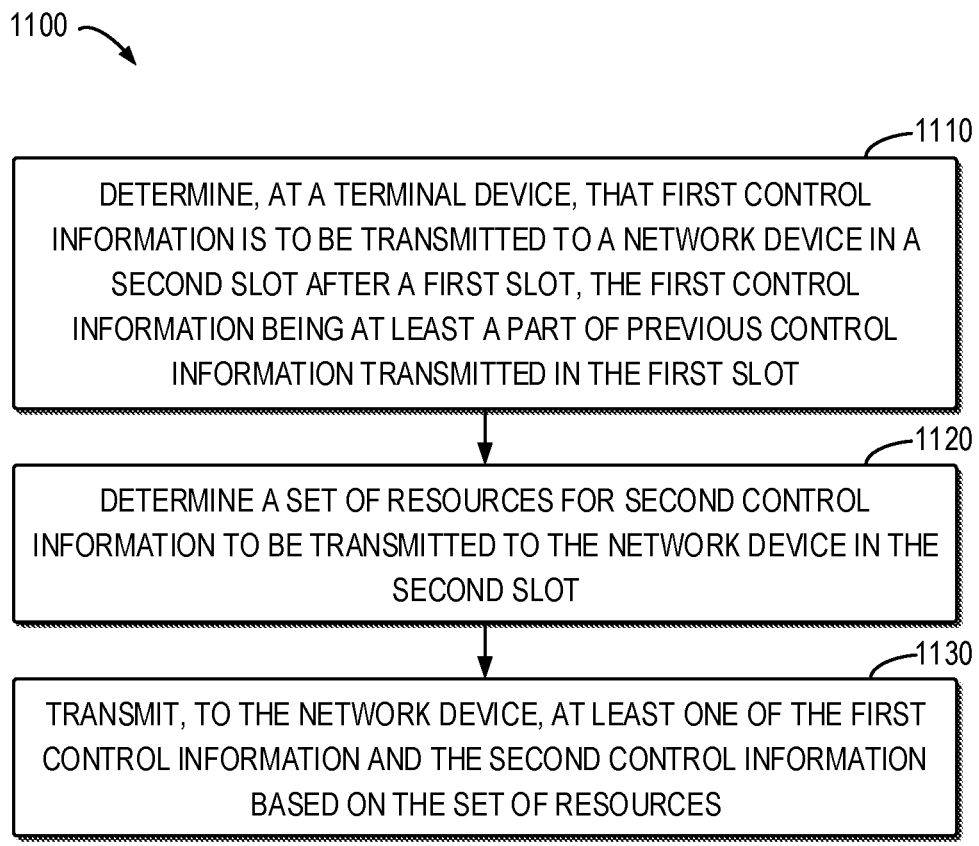
FIG. 11 illustrates a flowchart of an example method in accordance with some embodiments of the present disclosure.

FIG. 11 illustrates a flowchart of an example method 1100 in accordance with some embodiments of the present disclosure. In some embodiments, the method 1100 can be implemented at a terminal device, such as the terminal device 120 as shown in FIG. 1. Additionally or alternatively, the method 1100 can also be implemented at other terminal devices not shown in FIG. 1. For the purpose of discussion, the method 1100 will be described with reference to FIG. 1 as performed by the terminal device 120 without loss of generality.

At block 1110, the terminal device 120 can determine that first control information is to be transmitted to the network device 110 in a second slot after a first slot, the first control information being at least a part of previous control information transmitted in the first slot. At block 1120, the terminal device 120 may determine a set of resources for second control information to be transmitted to the network device 110 in the second slot. At block 1130, the terminal device 120 can transmit, to the network device 110, at least one of the first control information and the second control information based on the set of resources.

In some embodiments, the method 1100 further comprises: generating the first control information to include a first set of acknowledgement, ACK/negative acknowledgement, NACK, indications for a first set of slots for downlink transmissions; and generating the second control information to include a second set of ACK/NACK indications for a second set of slots for downlink transmissions.

In some embodiments, the method 1100 further comprises: generating the first control information to include a first set of ACK/NACK indications for a first set of downlink transmissions transmitted by the network device 110; and generating the second control information to include a second set of ACK/NACK indications for a second set of downlink transmissions transmitted by the network device 110.

In some embodiments, the method 1100 further comprises: generating the first control information to include a first set of ACK/NACK indications for a first set of downlink transmissions received by the terminal device 120; and generating the second control information to include a second set of ACK/NACK indications for a second set of slots for downlink transmissions.

In some embodiments, the method 1100 further comprises: generating the first control information to include a first set of ACK/NACK indications for a first set of downlink transmissions, ACK/NACK indications being configured to be repeatedly transmitted for the first set of downlink transmissions; and generating the second control information to include a second set of ACK/NACK indications for a second set of slots for downlink transmissions or a second set of ACK/NACK indications for downlink transmissions transmitted by the network device 110.

In some embodiments, transmitting at least one of the first control information and the second control information comprises: transmitting the first control information and the second control information using the set of resources.

In some embodiments, the previous control information is transmitted using a first set of resources in the first slot and the set of resources in the second slot is a second set of resources, and wherein transmitting at least one of the first control information and the second control information comprises: determining, based on the first set of resources, a third set of resources in the second slot for transmitting the first control information; in accordance with a determination that the second set of resources and the third set of resources are non-overlapped in time domain, transmitting the first control information using the third set of resources; and transmitting the second control information using the second set of resources.

In some embodiments, the previous control information is transmitted using a first set of resources in the first slot and the set of resources in the second slot is a second set of resources, and wherein transmitting at least one of the first control information and the second control information comprises: determining, based on the first set of resources, a third set of resources in the second slot for transmitting the first control information; in accordance with a determination that the second set of resources and the third set of resources are overlapped in time domain, transmitting the first control information using the third set of resources; or transmitting the second control information using the second set of resources.

In some embodiments, the previous control information is transmitted using a first set of resources in the first slot and the set of resources in the second slot is a second set of resources, and wherein transmitting at least one of the first control information and the second control information comprises: determining, based on the first set of resources, a third set of resources in the second slot for transmitting the first control information; in accordance with a determination that the second set of resources and the third set of resources are overlapped in time domain, transmitting the first control information and the second control information based on a comparison of available resources in the second slot with the second set of resources and the third set of resources in time domain.

In some embodiments, transmitting the first control information and the second control information based on the comparison comprises: in accordance with a determination that the available resources in the second slot are sufficient in time domain for providing the second set of resources and the third set of resources, determining a fourth set of resources in the second slot by applying a first offset in time domain to the second set of resources, such that the third set of resources and the fourth set of resources are non-overlapped in time domain; transmitting the first control information using the third set of resources; and transmitting the second control information using the fourth set of resources.

In some embodiments, transmitting the first control information and the second control information based on the comparison comprises: in accordance with a determination that the available resources in the second slot are sufficient in time domain for providing the second set of resources and the third set of resources, determining a fifth set of resources in the second slot by applying a second offset in time domain to the third set of resources, such that the second set of resources and the fifth set of resources are non-overlapped in time domain; transmitting the first control information using the fifth set of resources; and transmitting the second control information using the second set of resources.

In some embodiments, transmitting the first control information and the second control information based on the comparison comprises: in accordance with a determination that the available resources in the second slot are sufficient in time domain for providing the second set of resources and the third set of resources, determining a fourth set of resources in the second slot by applying a first offset in time domain to the second set of resources; determining a fifth set of resources in the second slot by applying a second offset in time domain to the third set of resources, such that the fourth set of resources and the fifth set of resources are non-overlapped in time domain; transmitting the first control information using the fifth set of resources; and transmitting the second control information using the fourth set of resources.

In some embodiments, transmitting the first control information and the second control information based on the comparison comprises: in accordance with a determination that the available resources in the second slot are insufficient in time domain for providing the second set of resources and the third set of resources, transmitting the first control information using the third set of resources; and transmitting the second control information in a third slot after the second slot.

In some embodiments, transmitting the second control information in the third slot comprises: in accordance with a determination that third control information is to be transmitted to the network device 110 in the third slot, transmitting the second control information and the third control information using a same set of resources in the third slot.

In some embodiments, the method 1100 further comprises: in accordance with a determination that third control information is to be transmitted to the network device 110 in the third slot, transmitting the third control information in a fourth slot after the third slot.

In some embodiments, transmitting the first control information and the second control information based on the comparison comprises: in accordance with a determination that the available resources in the second slot are insufficient in time domain for providing the second set of resources and the third set of resources, transmitting the second control information using the second set of resources; and transmitting the first control information in a third slot after the second slot.

In some embodiments, transmitting the first control information in the third slot comprises: in accordance with a determination that third control information is to be transmitted to the network device 110 in the third slot, transmitting the first control information and the third control information using a same set of resources in the third slot.

In some embodiments, the method 1100 further comprises: in accordance with a determination that third control information is to be transmitted to the network device 110 in the third slot, transmitting the third control information in a fourth slot after the third slot.

Figure 12:
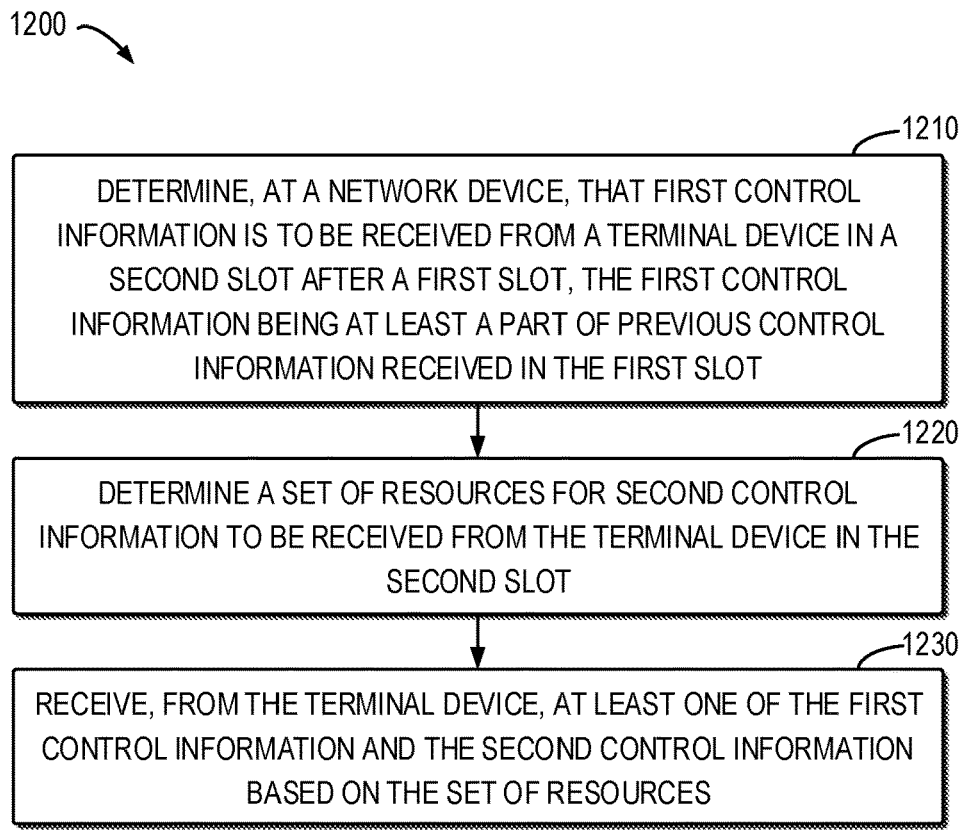
FIG. 12 illustrates a flowchart of another example method in accordance with some embodiments of the present disclosure.

FIG. 12 illustrates a flowchart of another example method 1200 in accordance with some embodiments of the present disclosure. In some embodiments, the method 1200 can be implemented at a network device, such as the network device 110 as shown in FIG. 1. Additionally or alternatively, the method 1200 can also be implemented at other network devices not shown in FIG. 1. For the purpose of discussion, the method 1200 will be described with reference to FIG. 1 as performed by the network device 110 without loss of generality.

At block 1210, the network device 110 can determine that first control information is to be received from the terminal device 120 in a second slot after a first slot, the first control information being at least a part of previous control information received in the first slot. At block 1220, the network device 110 may determine a set of resources for second control information to be received from the terminal device 120 in the second slot. At block 1230, the network device 110 can receive, from the terminal device 120, at least one of the first control information and the second control information based on the set of resources.

In some embodiments, the method 1200 further comprises: determining that the first control information includes a first set of ACK/NACK indications for a first set of slots for downlink transmissions; and determining that the second control information includes a second set of ACK/NACK indications for a second set of slots for downlink transmissions.

In some embodiments, the method 1200 further comprises: determining that the first control information includes a first set of ACK/NACK indications for a first set of downlink transmissions transmitted by the network device 110; and determining that the second control information includes a second set of ACK/NACK indications for a second set of downlink transmissions transmitted by the network device 110.

In some embodiments, the method 1200 further comprises: determining that the first control information includes a first set of ACK/NACK indications for a first set of downlink transmissions received by the terminal device 120; and determining that the second control information includes a second set of ACK/NACK indications for a second set of slots for downlink transmissions.

In some embodiments, the method 1200 further comprises: determining that the first control information includes a first set of ACK/NACK indications for a first set of downlink transmissions, ACK/NACK indications being configured to be repeatedly transmitted for the first set of downlink transmissions; and determining that the second control information includes a second set of ACK/NACK indications for a second set of slots for downlink transmissions or a second set of ACK/NACK indications for downlink transmissions transmitted by the network device 110.

In some embodiments, receiving at least one of the first control information and the second control information comprises: receiving the first control information and the second control information using the set of resources.

In some embodiments, the previous control information is received using a first set of resources in the first slot and the set of resources in the second slot is a second set of resources, and wherein receiving at least one of the first control information and the second control information comprises: determining, based on the first set of resources, a third set of resources in the second slot for receiving the first control information; in accordance with a determination that the second set of resources and the third set of resources are non-overlapped in time domain, receiving the first control information using the third set of resources; and receiving the second control information using the second set of resources.

In some embodiments, the previous control information is received using a first set of resources in the first slot and the set of resources in the second slot is a second set of resources, and wherein receiving at least one of the first control information and the second control information comprises: determining, based on the first set of resources, a third set of resources in the second slot for receiving the first control information; in accordance with a determination that the second set of resources and the third set of resources are overlapped in time domain, receiving the first control information using the third set of resources; or receiving the second control information using the second set of resources.

In some embodiments, the previous control information is received using a first set of resources in the first slot and the set of resources in the second slot is a second set of resources, and wherein receiving at least one of the first control information and the second control information comprises: determining, based on the first set of resources, a third set of resources in the second slot for receiving the first control information; in accordance with a determination that the second set of resources and the third set of resources are overlapped in time domain, receiving the first control information and the second control information based on a comparison of available resources in the second slot with the second set of resources and the third set of resources in time domain.

In some embodiments, receiving the first control information and the second control information based on the comparison comprises: in accordance with a determination that the available resources in the second slot are sufficient in time domain for providing the second set of resources and the third set of resources, determining a fourth set of resources in the second slot by applying a first offset in time domain to the second set of resources, such that the third set of resources and the fourth set of resources are non-overlapped in time domain; receiving the first control information using the third set of resources; and receiving the second control information using the fourth set of resources.

In some embodiments, receiving the first control information and the second control information based on the comparison comprises: in accordance with a determination that the available resources in the second slot are sufficient in time domain for providing the second set of resources and the third set of resources, determining a fifth set of resources in the second slot by applying a second offset in time domain to the third set of resources, such that the second set of resources and the fifth set of resources are non-overlapped in time domain; receiving the first control information using the fifth set of resources; and receiving the second control information using the second set of resources.

In some embodiments, receiving the first control information and the second control information based on the comparison comprises: in accordance with a determination that the available resources in the second slot are sufficient in time domain for providing the second set of resources and the third set of resources, determining a fourth set of resources in the second slot by applying a first offset in time domain to the second set of resources; determining a fifth set of resources in the second slot by applying a second offset in time domain to the third set of resources, such that the fourth set of resources and the fifth set of resources are non-overlapped in time domain; receiving the first control information using the fifth set of resources; and receiving the second control information using the fourth set of resources.

In some embodiments, receiving the first control information and the second control information based on the comparison comprises: in accordance with a determination that the available resources in the second slot are insufficient in time domain for providing the second set of resources and the third set of resources, receiving the first control information using the third set of resources; and receiving the second control information in a third slot after the second slot.

In some embodiments, receiving the second control information in the third slot comprises: in accordance with a determination that third control information is to be received from the terminal device 120 in the third slot, receiving the second control information and the third control information using a same set of resources in the third slot.

In some embodiments, the method 1200 further comprises: in accordance with a determination that third control information is to be received from the terminal device 120 in the third slot, receiving the third control information in a fourth slot after the third slot.

In some embodiments, receiving the first control information and the second control information based on the comparison comprises: in accordance with a determination that the available resources in the second slot are insufficient in time domain for providing the second set of resources and the third set of resources, receiving the second control information using the second set of resources; and receiving the first control information in a third slot after the second slot.

In some embodiments, receiving the first control information in the third slot comprises: in accordance with a determination that third control information is to be received from the terminal device 120 in the third slot, receiving the first control information and the third control information using a same set of resources in the third slot.

In some embodiments, the method 1200 further comprises: in accordance with a determination that third control information is to be received from the terminal device 120 in the third slot, receiving the third control information in a fourth slot after the third slot.

Figure 13:
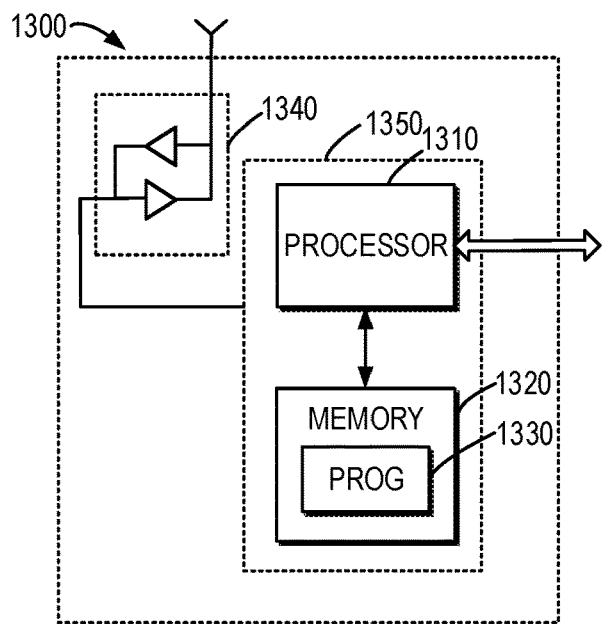
FIG. 13 is a simplified block diagram of a device that is suitable for implementing some embodiments of the present disclosure.

FIG. 13 is a simplified block diagram of a device 1300 that is suitable for implementing some embodiments of the present disclosure. The device 1300 can be considered as a further embodiment of the network device 110 and the terminal device 120 as shown in FIG. 1. Accordingly, the device 1300 can be implemented at or as at least a part of the network device 110 and the terminal device 120.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1320 stores at least a part of a program 1330. The TX/RX 1340 is for bidirectional communications. The TX/RX 1340 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 1330 is assumed to include program instructions that, when executed by the associated processor 1310, enable the device 1300 to operate in accordance with the embodiments of the present disclosure, as discussed herein with reference to any of FIGS. 7, 8, 11, and 12. The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1320 may form processing means 1350 adapted to implement various embodiments of the present disclosure.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In some embodiments, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 7, 8, 11, and 12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication performed by a terminal device, the method comprising:
    determining that first control information is to be deferred from a first slot to a second slot,
    wherein the second slot is after the first slot; and
    multiplexing, in a Physical Uplink Control Channel (PUCCH) in the second slot, the first control information and second control information.

2. The method of claim 1, wherein the first control information comprises first Hybrid automatic repeat request acknowledgement (HARQ-ACK) information, and the second control information comprises second Hybrid automatic repeat request acknowledgement (HARQ-ACK) information.

3. The method of claim 1, further comprising:
determining a resource for the PUCCH.

4. The method of claim 1, further comprising:
transmitting the PUCCH.

5. The method of claim 1, wherein the terminal device appends the first control information to the second control information.

6. A method for communication performed by a network device, the method comprising:
  determining that first control information is to be deferred from a first slot to a second slot, wherein the second slot is after the first slot; and
  receiving a Physical Uplink Control Channel (PUCCH) in the second slot, wherein the first control information and second control information are multiplexed in the PUCCH.

7. The method of claim 6, wherein the first control information comprises first Hybrid automatic repeat request acknowledgement (HARQ-ACK) information, and the second control information comprises second Hybrid automatic repeat request acknowledgement (HARQ-ACK) information.

8. The method of claim 6, wherein a resource for the PUCCH is determined by the terminal device.

9. The method of claim 6, wherein the first control information is appended to the second control information.

10. A terminal device, comprising:
  one or more memories having stored therein programming instructions;
  one or more processors that upon executing the programming instructions performs operations comprising:
    determining that first control information is to be deferred from a first slot to a second slot, wherein the second slot is after the first slot; and
    multiplexing, in a Physical Uplink Control Channel (PUCCH) in the second slot, the first control information and second control information.

11. The terminal device of claim 10, wherein the first control information comprises first HARQ-ACK information, and the second control information comprises second HARQ-ACK information.

12. The terminal device of claim 10, further comprising:
determining a resource for the PUCCH.

13. The terminal device of claim 10, further comprising:
transmitting the PUCCH.

14. The terminal device of claim 10, wherein the UE appends the first control information to the second control information.

* * * * *